United States Patent
Park et al.

(10) Patent No.: US 10,990,585 B2
(45) Date of Patent: Apr. 27, 2021

(54) TRANSACTION-SPECIFIC SELECTIVE UNCOMMITTED READ FOR DATABASE TRANSACTIONS

(71) Applicant: SAP SE, Walldorf (DE)

(72) Inventors: Chang Gyoo Park, Seoul (KR); Juchang Lee, Seoul (KR)

(73) Assignee: SAP SE, Walldorf (DE)

( * ) Notice: Subject to any disclaimer, the term of this patent is extended or adjusted under 35 U.S.C. 154(b) by 368 days.

(21) Appl. No.: 15/976,441

(22) Filed: May 10, 2018

(65) Prior Publication Data

US 2019/0347348 A1 Nov. 14, 2019

(51) Int. Cl.
*G06F 16/23* (2019.01)

(52) U.S. Cl.
CPC ...... *G06F 16/2379* (2019.01); *G06F 16/2365* (2019.01)

(58) Field of Classification Search
CPC .......................... G06F 16/2379; G06F 16/2365
See application file for complete search history.

(56) References Cited

U.S. PATENT DOCUMENTS

| | | | | |
|---|---|---|---|---|
| 2002/0087500 A1* | 7/2002 | Berkowitz | .......... | G06F 16/2365 |
| 2004/0225915 A1* | 11/2004 | Johnson | .............. | G06F 11/2007 714/13 |
| 2006/0190498 A1* | 8/2006 | Pruet, III | ............ | G06F 16/2443 |
| 2006/0288173 A1* | 12/2006 | Shen | ................... | G06F 9/30072 711/141 |
| 2009/0019209 A1* | 1/2009 | Shen | ................... | G06F 9/30087 711/100 |

OTHER PUBLICATIONS

"Set Transaction Isolation Level (Transact-SQL)", Microsoft, retrieved from https://docs.microsoft.com/en-us/sql/t-sql/statements/set-transaction-isolation-level-transact-sql?view=sql-server-2017, Dec. 4, 2017, 8 pages.
Berenson, H., et al., "A Critique of ANSI SQL Isolation Levels", Proc. ACM SIGMOD 95, San Jose, CA, Jun. 1995, 12 pages.
Lee, J., et al., "Hybrid Garbage Collection for Multi-Version Concurrency Control in SAP HANA", In: Proceedings of the 2016 International Conference on Management of Data, ACM, Jun. 26, 2016, pgs. pp. 1307-1318.
Melton, J., editor, Ansi x3. 135-1992, American National Standard, Database Language sql. American National Standards Institute (1992), 628 pages.

* cited by examiner

*Primary Examiner* — Usmaan Saeed
*Assistant Examiner* — Jessica N Le
(74) *Attorney, Agent, or Firm* — Fish & Richardson P.C.

(57) ABSTRACT

Techniques are described for use in database and data management systems to enable a database transaction to read uncommitted data from another database transaction on a selective (e.g., transaction-specific) basis, without requiring a change in the isolation level of either transaction (or related transactions). Accordingly, transaction speeds may be increased, and operations to audit or debug ongoing database transactions are also facilitated.

17 Claims, 20 Drawing Sheets

```
1   Transaction 1 {
2       Insert into table values (...);
3       select * from table1;
4       tid = GetTransactionId();    1902
5       Transaction 2 {
6           SnoopUncommittedChanges(tid);    1904
7           Select * from table1;
8           update table2 set ...;
9           ...
10          commit;
11      }
12      ...
13      commit;
14  }
```

FIG.19

TRANSACTION-SPECIFIC SELECTIVE UNCOMMITTED READ FOR DATABASE TRANSACTIONS

TECHNICAL FIELD

This description relates to database processing.

BACKGROUND

Databases are generally used to store large quantities of information, in an organized manner that enables fast and convenient searching and other database operations. Often, such large databases are accessed by multiple entities (e.g., users, or clients) during overlapping time frames. In order to maintain data consistency, lock management techniques are used to ensure that a given data entry may only be changed by one such entity at a time. Thus, such lock management techniques ensure correct, expected results from database changes (e.g., writes, deletions, modifications).

Meanwhile, the same database system may also be accessed for query or read operations. That is, for example, even while some users or operations are making database changes, other users may simply need to access the same database, in order to obtain desired information. Such read operations do not generally present a danger of causing data inconsistency within the database tables being read, since the read operations are not changing those database tables. However, other difficulties may be encountered, such as the danger that the read operations will receive incorrect or incomplete results. Such difficulties may be mitigated or controlled to a desired extent through the use of isolation levels, which generally define an extent to which a database transaction is isolated from reading changes made by other transactions.

Lock management techniques and isolation levels help to provide consistent, complete, accurate database operations, but consume computing resources, while also contributing to processing delays (including causing bottlenecks in the context of otherwise high-speed database transactions). Consequently, it is desirable to retain and/or optimize the associated benefits, while also conserving computing resources and increasing a speed with which correct database operations are conducted.

BRIEF DESCRIPTION OF THE DRAWINGS

FIG. 19 illustrates example pseudocode of an additional example implementation of the system 100 of FIG. 1.

DETAILED DESCRIPTION

Figure 1:
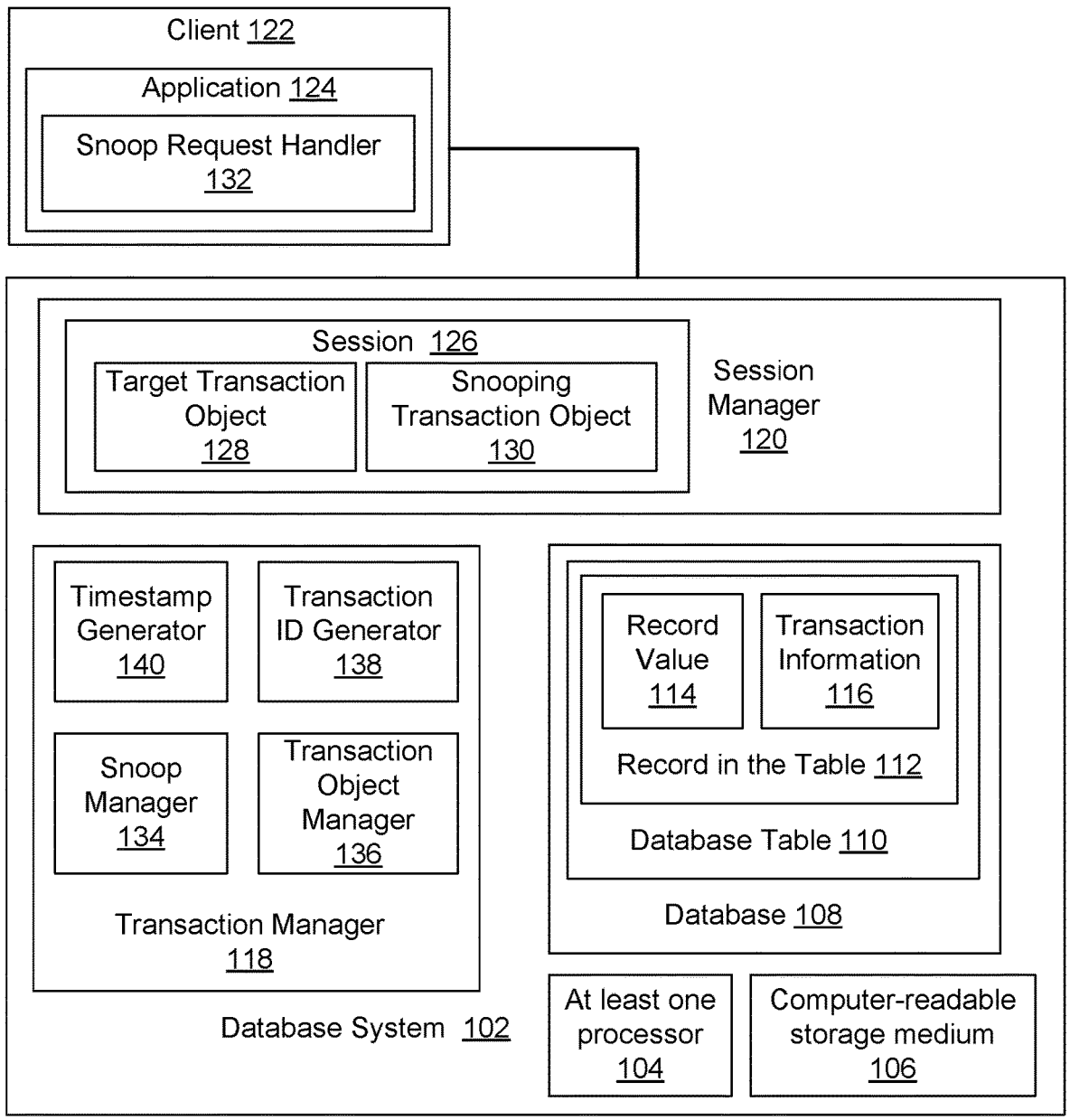
FIG. 1 is a block diagram of a system for transaction-specific selective uncommitted read for database transactions.

FIG. 1 is a block diagram of a system for transaction-specific selective dirty read for database transactions. In FIG. 1, a database system 102 includes at least one processor 104, as well as non-transitory computer-readable storage medium 106. That is, the database system 102 should be understood to be implemented using suitable hardware processing resources, including two or more processors acting in parallel, as well as any suitable computer memory, or memories. For example, the database system 102 may be implemented as an in-memory or main memory database system, in which a main memory is used for database calculations and other operations, while a secondary memory (e.g., disk storage) is used for bulk, long-term, or backup data storage. One example of such an in-memory or main memory database system is the HANA database system of SAP SE of Walldorf Germany.

The database system 102 is illustrated as including a database 108, which includes a database table 110, which itself includes a record 112. Of course, FIG. 1 is a highly simplified example that is provided for the sake of illustration and explanation, and, in practice, the database system 102 may include extremely large numbers of databases, tables, and records. Moreover, the database system 102 may be implemented in many different ways, such as row store or column store implementations, or combinations thereof, which are not described here in detail, but would be apparent to one of skill in the art.

Further in FIG. 1, the record 112 is illustrated as including a record value 114, which is stored within the record 112 in association with transaction information 116. In this regard, a database transaction, or just transaction, refers generally to a logical unit of work, e.g., sequence or flow of operations, applied against a database, such as the database 110. Transactions may be implemented to cause desired changes to the database 108, such as writing or deleting the record value 114, or may be implemented to query or read existing data (such as the record value 114).

Transactions may be executed independently of one another, or may be dependent, such as when a transaction requires the input of an earlier transaction in order to proceed. Each transaction is ended by a transaction commit (also referred to as commitment), which finalizes or completes the transaction, and saves the resulting data changes indefinitely within the database (e.g., until changed by another operation).

In other words, during an ongoing execution of a transaction, related data and data changes may be considered tentative or potential. For example, even if multiple operations of a transaction have already been completed, a current operation that reaches a nonviable or error state may cause the entire transaction to experience rollback, in which all of the previously-executed operations are undone and the database is returned to a previous state that existed prior to commencement of the transaction.

Put another way, a single transaction may include multiple internal operations, executed over a period of time. For example, a transaction may include multiple operations, O1, O2, O3, and O4 executed at times t1, t2, t3, and t4. Following the time t1 at which the transaction begins with the operation O1, until the time t4 after which the operation O4 is completed, the transaction is considered to be open or uncommitted.

Thus, one way to help ensure data consistency and accuracy is to wait for a transaction to commit before reading a transaction result. There are existing isolation levels that take this or a similar type of approach (e.g., the serializable or snapshot isolation levels). However, this approach requires waiting until a time following time t4 in the above example. In the aggregate, e.g., across many different operations and transactions, the delays (and associated resource usage) resulting from this approach may be undesirable or unacceptable.

Another option is to read the data prior to commitment occurring, which may be referred to as an uncommitted read, or dirty read. For example, data could be read following completion of the operation O2 at time t2. This approach is potentially problematic because, for example, results of the operation O2 may change during the remainder of the transaction. For example, the operation O2 may be rolled back (undone), or the operation O3 or O4 may further change the results of O2. More generally, results of a query may be inconsistent with other parts of relevant table(s), or inconsistent with other parts of the query itself, or inconsistent with other queries.

Some scenarios exist in which uncommitted (dirty) reads are permitted. In particular, as referenced above, it is possible to assign various different isolation levels to database transactions. In some existing database systems, at least one such isolation level permits uncommitted reads, and may be selected or permitted with respect to one or more transactions. For example, such an isolation level may be appropriate when it is acceptable to treat query results as estimates, or any time that a defined threshold of error is acceptable in order to obtain results faster.

Such existing uses and implementations are limited to particular scenarios, while, even there, being potentially problematic and prone to unintended or unpredictable consequences. For example, a transaction or group of transactions granted an uncommitted read isolation level may attempt to read results from a large number of transactions or transaction operations. Therefore, it may be difficult to account for potential errors that may occur, particularly in the aggregate.

The system 100 of FIG. 1 provides for transaction-specific, selective dirty read operations, in which individual transactions are specified for uncommitted reads with respect to one another. In other words, for example, a conventional transaction that is designated with a conventional uncommitted read isolation level typically is permitted to perform uncommitted reads with respect to any available, target transaction, and/or is open to having its uncommitted data read by any requesting transaction.

In contrast, as described in detail below, a transaction manager 118 of FIG. 1 is configured to permit and enable a single transaction, referred to as a snooping transaction, to perform uncommitted reads with respect to a single target transaction (or specified group of individual, target transactions). This approach may be enabled independently or separately from an existing isolation level of either the snooping or target transaction. In other words, for example, either the snooping and/or target transaction may have a restrictive isolation level(s), but the approaches described herein provide a selective, transaction-specific relaxation of those restrictions or constraints, without changing the isolation level of the transaction(s) as a whole.

Further, the system 100 of FIG. 1 thus enables obtaining many of the benefits of performing uncommitted reads (e.g., faster processing), while limiting or eliminating potential risks. For example, by permitting uncommitted reads selectively, it becomes possible to examine a specific target transaction(s) (e.g., internal operations thereof), and take corresponding action to reduce or eliminate risks associated with performing uncommitted reads (examples are provided below, e.g., with respect to FIGS. 16-18).

In FIG. 1, a transaction manager 118 may interact with a session manager 120 to provide the above-referenced features and benefits to a client 122 executing a software application 124 designed to access the database 108. Of course, the database system 102 should be understood to include many other components besides the transaction manager 118 and the session manager 120 (e.g., a component for performing details of query executions), which are not described here for the sake of clarity and conciseness. Similarly, the transaction manager 118 and the session manager 120 themselves may include various features that are not described here in detail, except as may be necessary or helpful in understanding the operations of the system 100 of FIG. 1.

In general, any query received from the client 122 may be received by the session layer 120 with respect to a particular instance of the database 108. The session layer 120 may be configured, for example, to compile the received query, formulate an execution plan for the query within the database instance, and ultimately provide a query response, if any, to the client 122.

Meanwhile, the transaction manager 118 is generally configured to implement logistical aspects of interactions with the database 108, and, in particular, with individual database table 110. In more detail, the transaction manager 118 may be configured to track running and closed transactions, including specific transaction events, such as transaction commits or rollback operations. The transaction manager 118 may also be configured to inform the database 110 with respect to such transaction events, so that the database 110 may execute any associated actions.

Thus, the system 100 generally represents and illustrates simplified scenarios in which various clients, represented by the client 122, are configured to issue a plurality of queries and associated database commands to a single/same instance of the database system 102. The various queries and commands are received at the session layer 120, which, as referenced, may compile or otherwise prepare the various received queries and commands for use by the transaction manager 118.

Following successful completion of a requested database operation, a control flow to execute a transaction commit may be executed. For example, the client 122 may send a commit command to the database instance, and the session layer 120 may again interpret or compile the received command. In this case, the received command is a transaction control command, and not, e.g., an SQL statement. Accordingly, the transaction manager 118 may proceed to commit the previously-started transaction.

As referenced above, in FIG. 1, the record value 114 of the record 112 is stored in conjunction with transaction information 116. Detailed examples and explanations of the transaction information 116 are provided below, e.g., with respect to FIG. 3. In general, the transaction information 116 is defined, stored, and accessed by the transaction manager 118 and the session manager 120 in a manner that enables the types of transaction-specific, selective uncommitted reads described herein.

In more detail, as shown, the session manager 120 may define a session 126 with respect to the application 124, and at least two transactions thereof. As already referenced above, the at least two transactions may be referred to as a snooping transaction and a target transaction, where the snooping transaction is configured to perform uncommitted reads with respect to the target transaction. In FIG. 1, it should be appreciated that the session 126 represents at least one session, but possible two or more sessions. For example, the target transaction object 128 and the snooping transaction object 130 may belong to different sessions.

In the system 100 of FIG. 1, each database transaction is associated with, e.g., defined with respect to, a corresponding transaction object (detailed examples and explanations of which are also provided below, e.g., with respect to FIG. 3). Thus, the session 126 includes a target transaction object 128 and a snooping transaction object 132.

Further, the application 124 is illustrated as including a snoop request handler 132, which receives a request in the context of the application 124 for a specified uncommitted read operation(s). In particular, the transaction manager 118 includes a snoop manager 134, which may represent or include an application program interface (API) that is callable by the snoop request handler 132.

The snoop manager 134 leverages and controls operations of other components of the transaction manager 118 to provide the various features and benefits described herein. In particular, a transaction object manager 136 is configured to create, update, maintain, and generally allocate/deallocate transaction objects, such as the target transaction object 128 and the snooping transaction object 130. In so doing, the transaction object manager 136 may utilize a transaction identifier (ID) generator 138, as well as a timestamp generator 140, as described below.

Figure 2:
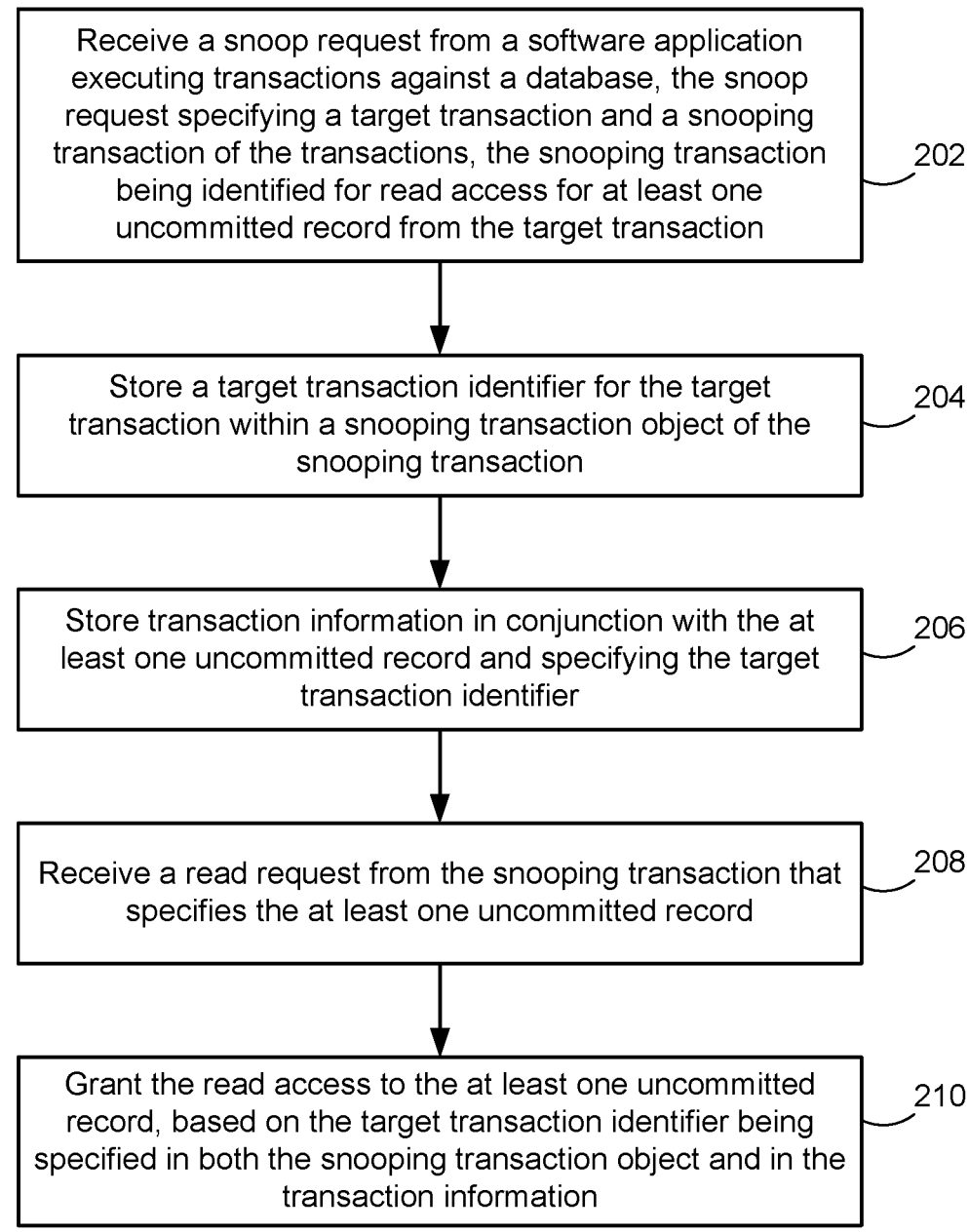
FIG. 2 is a flowchart illustrating example operations of the system for FIG. 1.

In particular, FIG. 2 is a flowchart 200 illustrating example operations of the system 100 of FIG. 1. In the example of FIG. 2, operations 202-210 are illustrated as separate, sequential operations. In various implementations, additional or alternative operations or sub-operations may be included, and/or one or more operation or sub-operation may be omitted. In these and other implementations, it may occur that any two or more operations or sub-operations occur in a partially or completely overlapping or parallel manner, or in a nested, iterative, branched, or looped fashion.

In the example of FIG. 2, a snoop request is received from a software application executing transactions against a database, the snoop request specifying a target transaction and a snooping transaction of the transactions, the snooping transaction being identified for read access for at least one uncommitted record from the target transaction (202). For example, as just described, such a snoop request may be received from the software application 124, via the snoop request handler 132. As referenced, the snoop request may specify a target transaction corresponding to the target transaction object 128, as well as a snooping transaction corresponding to the snooping transaction object 130. The snooping transaction of the snooping transaction object 130 is thus identified for read access for at least one uncommitted record from the target transaction.

As also referenced, the snoop manager 134 of the transaction manager 118 may be configured to receive the snoop request from the snoop request handler 132. Further, in many of the following examples, the record 112 represents the type of uncommitted record associated with the target transaction, and with the target transaction object 128. Consequently, the record value 114 represents an example of data that may be uncommitted within the database table 110, but that may nonetheless be read by the snooping transaction, as described herein.

Specifically, a target transaction identifier for the target transaction may be stored within a snooping transaction object of the snooping transaction (204). For example, the snoop manager 134 may cause the transaction object manager 136 to store such a target transaction identifier within the snooping transaction object 130. In other words, as described below, the target transaction identifier may be included in a listing or set of visible target transaction(s) that are readable by that snooping transaction, even when the target transaction(s) is uncommitted.

Transaction information may be stored in conjunction with the at least one uncommitted record and specifying the target transaction identifier (206). For example, the snoop manager 134 may cause the transaction information 116 to be updated with a pointer to the target transaction object 128.

A read request may be received from the snooping transaction that specifies the at least one uncommitted record (208). For example, the snooping transaction requested by the application 124 may request to read the record value 114, representing the uncommitted record value associated with the transaction information 116 within the record 112.

The read access to the at least one uncommitted record may be granted, based on the target transaction identifier being specified in both the snooping transaction object and in the transaction information (210). For example, the snoop manager 134 may grant the read request of the snooping transaction of the snooping transaction object 130 for the record value 114, based on the fact that the record value 114 is stored in association with the transaction information 116, and where the transaction information 116 specifies (e.g., points to, or otherwise identifies) the target transaction object 128.

Figure 3:
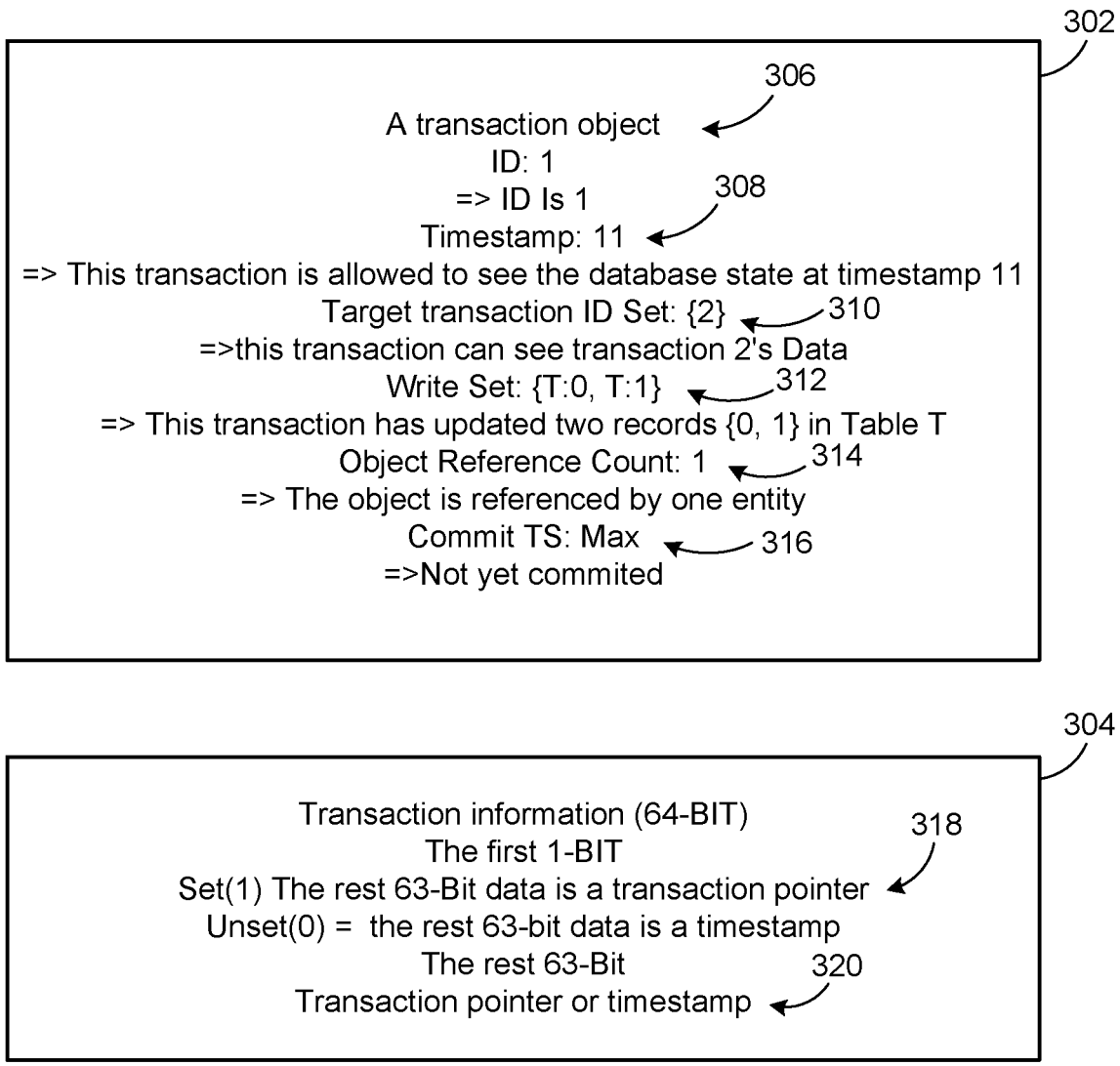
FIG. 3 is a block diagram illustrating example formats for a transaction object and transaction information that may be used in the system of FIG. 1.

FIG. 3 is a block diagram illustrating example formats for a transaction object 302 and transaction information 304 that may be used in the system 100 of FIG. 1. In other words, for example, the transaction object 302 corresponds to either of the target transaction object 128 or the snooping transaction object 130, while the transaction information 304 represents the transaction information 116 of FIG. 1.

As shown, in the transaction object 302, a field 306 includes an identifier of a corresponding transaction. In the simplified example of FIG. 3, the identifier (ID) is given a value of 1. In general, a transaction identifier (transaction ID, or TID) generally is selected to uniquely identify a specific transaction within the appropriate, corresponding context of the database system 102.

A field 308 includes a timestamp value, illustrated in the example of FIG. 3 as having a value of 11. That is, the timestamp field is populated with a value provided by the timestamp generator 140 of the transaction manager 118, and identifies a time at which the corresponding transaction is permitted to see a corresponding database state. That is, in the example, the transaction object 302 would be permitted to see a state of another transaction object and associated transaction, as long as that transaction has a timestamp of 11 or less.

The transaction object 302 also includes a field 310 specifying a target transaction identifier set. In other words, the transaction object 302 utilizes the field 310 to identify one or more target transactions that will be visible to the transaction object for purposes of the type of uncommitted reads described herein. In the example of FIG. 3, the field 310 includes a transaction ID having the value 2, meaning that the transaction corresponding to the transaction object 302 can perform uncommitted reads with respect to the data associated with transaction ID 2.

With respect to the field 310, it will be appreciated that the transaction object 302 may represent either or both of the target transaction object 128 and the snooping transaction object 130, in various scenarios. That is, for example, the transaction object 302 may represent a target transaction object that is being snooped by the first snooping transaction object, while itself serving as a snooping transaction object with respect to a separate (target) transaction object. In other words, for example, the transaction object 302 may be configured to snoop transaction data of a transaction specified within the field 310, while itself being snooped by a separate transaction, as well.

A field 312 illustrates a write set that identifies records within a specific table that have been updated by the transaction of the transaction object 302. In general, the write set of the field 312 and specified data records will be associated with appropriate, corresponding database locks designed to ensure consistency with respect to write operations of other transactions.

A field 314 represents an object reference count that defines a number of entities referencing the transaction object 302. In the example of FIG. 3, the illustrated object reference count is set to a value of 1, meaning that, for example, only a single transaction has a pointer to the transaction object 302. As referenced below, the object reference count of the field 314 may represent an explicit, stored value for a number of referencing entities, and/or may be stored implicitly by storing a separate identifier for each referencing entity.

Finally with respect to the transaction object 302, a field 316 specifies a timestamp (TS) at which a transaction commit of the transaction corresponding to the transaction object 302 occurs. In the example of FIG. 3, the transaction commit has not yet occurred, so that the value of the field 316 is set to max.

Further in FIG. 3, the transaction information 304 includes a field 318 and a field 320. As shown, the field 318 may represent metadata that characterizes a nature of content of the field 320.

Specifically, in the example of FIG. 3, the field 318 is implemented using a single bit, which may therefore be set either to a value of 0 or 1. In the example, if set to 1, the field 318 identifies that the content of the field 320 is a 63-bit transaction pointer, which would thus point to the transaction object 302 and cause the object reference count of the field 314 to be incremented. On the other hand, if the field 318 is not set, e.g., has a value of 0, then the field 320 is indicated to include a timestamp. As described below, for example, the timestamp of the field 320 may represent a commit timestamp of a corresponding transaction.

Figure 4:
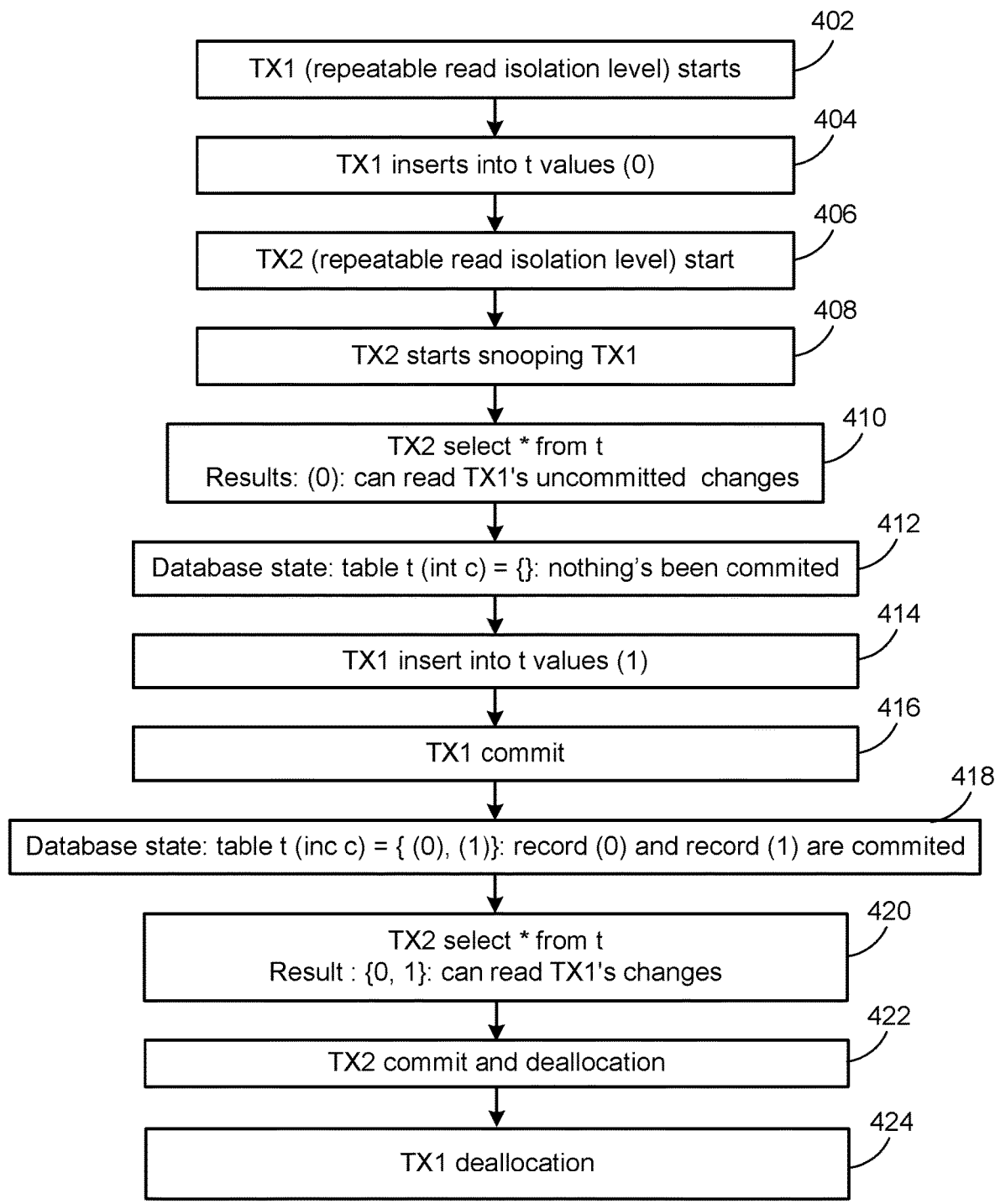
FIG. 4 is a flowchart illustrating an example database usage scenario utilizing the system 100 of FIG. 1.

FIG. 4 is a flowchart 400 illustrating an example database usage scenario utilizing the system 100 of FIG. 1. In the example of FIG. 4, a transaction TX1 represents a target transaction, such as may be associated with the target transaction object 128, while a transaction TX2 represents a snooping transaction designated for snooping the target transaction TX1, and corresponding to the snooping transaction object 130.

FIG. 4 provides a high-level overview of the described scenario, in order to provide a start-to-finish description thereof. Subsequent FIGS. 5-14 each provide more detail with respect to at least one of operations 402-424 of FIG. 4.

In the example of FIG. 4, the transaction TX1 starts (402). In the example, the transaction TX1 is illustrated as having a repeatable read isolation level, which is an isolation level that provides, in addition to read guarantees provided by the read-committed isolation level, that any data read is guaranteed to be the same if/when read again by the same transaction(s). In other words, as referenced above, FIG. 4 illustrates that the transaction TX1 may be associated with a particular isolation level, and that the uncommitted read operations described herein may be executed in the context of, and without changing, that isolation level.

In the simplified example, the transaction TX1 proceeds to insert values into a specified database table (404). In the example, the table is represented as t (which may represent, e.g., the table 110 of FIG. 1), and the inserted values are represented as (0).

The transaction TX2 then starts (406). Again, the transaction TX2 is illustrated as having a repeatable read isolation level, thereby illustrating that the following operations of FIG. 4 may be executed without regard for, and without changing, the isolation level of the transaction TX2.

TX2 may then begin to snoop TX1 (408). Specifically, in the example, even though the transaction TX1 is uncommitted, and even though the transaction TX1 has the repeatable read isolation level, the transaction TX2 may perform a select or other read operation from relevant records of the table t (410). As a result, the transaction TX2 may receive a result corresponding to the previous insert operation of the transaction TX1, therefore represented in FIG. 4 as a result {0}.

FIG. 4 illustrates that a database state for the table t indicates that no transaction commit for the transaction TX1 has occurred (412). The transaction TX1 may then insert additional values into the table t, illustrated in FIG. 4 as inserting values (1) (414). Following this insertion, the transaction TX1 may proceed to commit (416). Consequently, the database state of the table t is indicated to be {(0), (1)}, indicating that previously-inserted records (0) and (1) have now been committed (418).

Further in FIG. 4, it may occur that the transaction TX2 executes a select or other read command with respect to the table t (420). The corresponding result set is illustrated as {0, 1} because the transaction TX2 is permitted to read the committed changes of the transaction TX1. As described in detail below with respect to FIGS. 11 and 12, this result would not generally be feasible in conventional systems, because the transaction TX2 began after commencement of the transaction TX1, and both transactions TX1, TX2 are illustrated as having the repeatable read isolation level. In such scenarios, the transaction TX2 would normally only be able to read a state of the table t corresponding to a time (and associated timestamp) prior to the beginning of the transaction TX1, in order to ensure repeatability.

Continuing the example of FIG. 4, the transaction TX2 commits, resulting in a deallocation of a corresponding transaction object (422). The transaction object for the transaction TX1 may then be deallocated, as well (424). That is, as may be observed from the process flow of FIG. 4, and as described in detail below with respect to FIGS. 13 and 14, the transaction object for the transaction TX1 is kept alive (e.g., not deallocated), until following a commit and deallocation performed with respect to the (snooping) transaction TX2 and its corresponding transaction object. Accordingly, the transaction TX2 may continue to have the type of transaction-specific, selective uncommitted read permissions described herein with respect to the transaction TX1, until the transaction TX2 itself has fully completed.

As referenced above, FIGS. 5-14 are block diagrams illustrating operations of corresponding portions of the system 100 of FIG. 1, as those portions execute various, corresponding operations 402-424 of FIG. 4.

Figure 5:
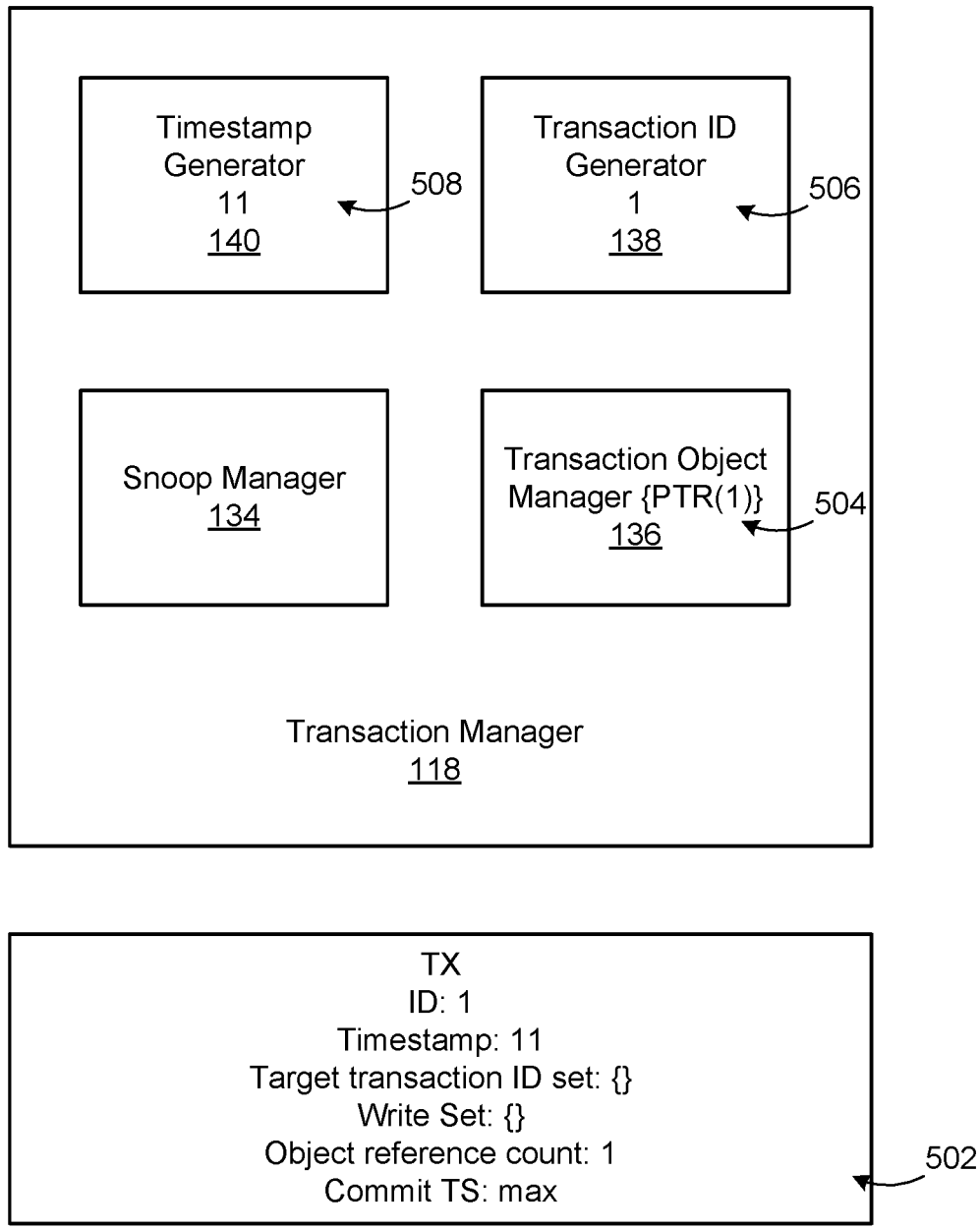
FIG. 5 is a block diagram illustrating an example implementation of the first operation of FIG. 4.

FIG. 5 is a block diagram illustrating example operations of the transaction manager 118 in implementing the first operation 402 of FIG. 4. That is, as illustrated, as the transaction TX1 begins, the transaction ID generator 138 generates a new transaction ID, illustrated as transaction ID 1 506. As the transaction TX1 is in the repeatable read isolation mode, the timestamp generator 140 generates a snapshot timestamp for the transaction, illustrated in FIG. 5 as having a timestamp value of 11 508.

A corresponding transaction object 502 is generated by the transaction object manager 136. Thus, the transaction object 502 of FIG. 5 represents, and corresponds to, the target transaction object 128 of FIG. 1. In conjunction therewith, the transaction object manager 136 may generate a pointer 504 that points to the transaction TX1. As described above and illustrated in detail below with respect to FIG. 6, the pointer 504 may thus be included within the transaction information of each record that is inserted by virtue of operations of the transaction TX1. Further, specific content of the transaction object 502 may be understood with reference to the transaction object 302 of FIG. 3.

As shown, the transaction object 502 has a transaction identifier with the value 1, the generated timestamp value 11, and a commit timestamp value of max. The target transaction ID set is empty, because the transaction TX1 is not snooping any other transactions. The write set field is also empty, because the transaction TX1 has not yet executed any write operations. Further, the object reference count field is set to 1, because the corresponding session of the transaction TX1 owns the transaction object 502, and therefore itself references the transaction object 502.

Figure 6:
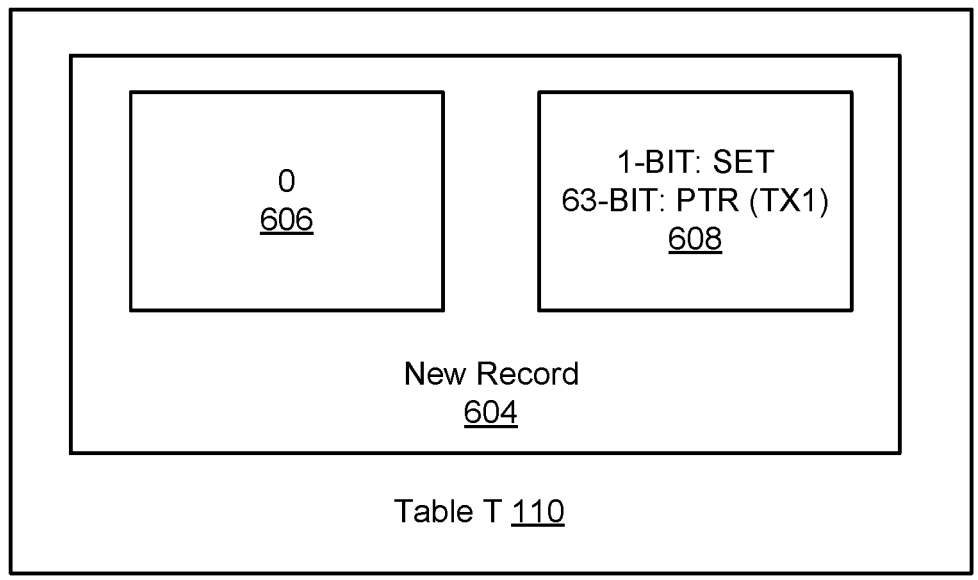
FIG. 6 is a block diagram illustrating an example implementation of the second operation of FIG. 4.
Figure 6:
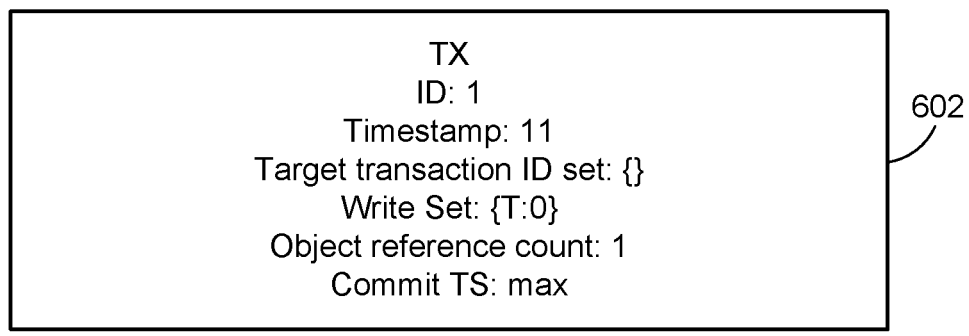

FIG. 6 is a block diagram illustrating implementation of the second operation 404 of FIG. 4. Specifically, FIG. 6 illustrates implementation of insertion of values (0) into the tablet as part of operation of the transaction TX1.

Thus, in FIG. 6, a transaction object 602 corresponds to the transaction object 502 of FIG. 5, but with updates corresponding to the described insertion operation. Specifically, as shown, the write set field is now set to a value of {T:0}.

Further in FIG. 6, a new record 604 with the example value (0) 606 is inserted into the tablet, illustrated in the example as the table 110 of FIG. 1. Further, transaction information 608 for the new record 604 is set and updated to include a pointer to the transaction object 602. It will be appreciated that, as of the time of implementation of the operation 404 as illustrated in FIG. 6, the record 604 and the record value 606 are invisible to all other transactions, because of the repeatable read isolation level of the transaction TX1.

Figure 7:
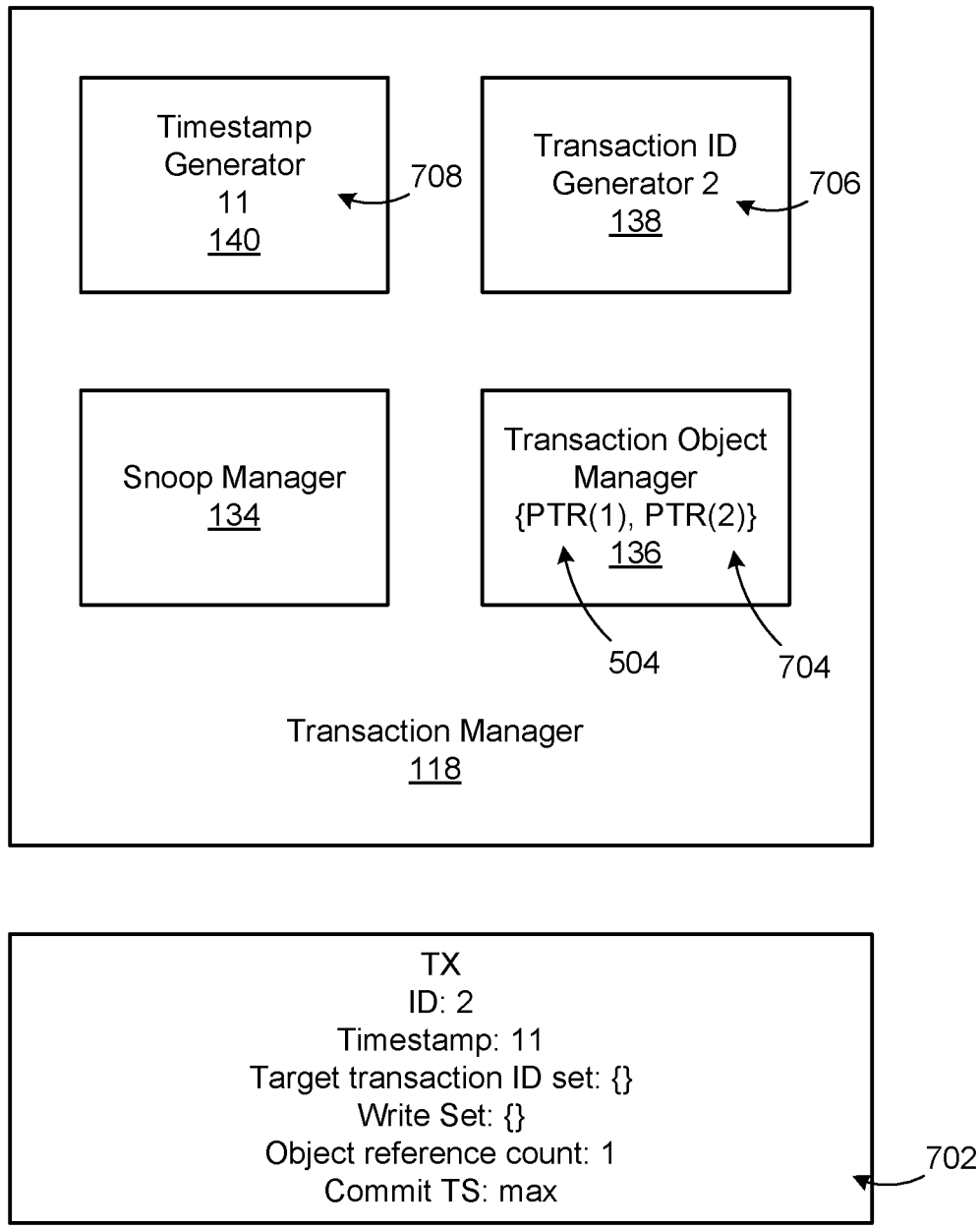
FIG. 7 is a block diagram illustrating an example implementation of the third operation of FIG. 4.

FIG. 7 is a block diagram illustrating an implementation of the third operation 406 of FIG. 4, in which the transaction TX2 begins. As shown, the transaction object manager 136 generates an additional pointer 704 that points to a transaction object 702 that corresponds to the transaction TX2.

Thus, the transaction object 702 of FIG. 7 corresponds to, and represents, the snooping transaction object 130 of FIG. 1, and the transaction TX2 represents an example of a corresponding snooping transaction with respect to the target transaction TX1. Consequently, the transaction object 702 includes the transaction ID 2, generated by the transaction ID generator 138 as transaction ID 706.

The timestamp generator 140 generates a snapshot timestamp for the transaction TX2, where the timestamp 708 is illustrated as having the value 11. Because snooping has not yet begun, the target transaction ID set of the transaction object 702 is empty. Similarly, the write set field is empty, because the transaction TX2 is not requesting write operations with respect to any other transaction. The object reference count field of the transaction object 702 is set to 1, reflecting the existence of the corresponding transaction TX2 and its pointer 704. Finally in FIG. 7, the commit timestamp is set to max, because the transaction TX2 is currently uncommitted.

Figure 8:
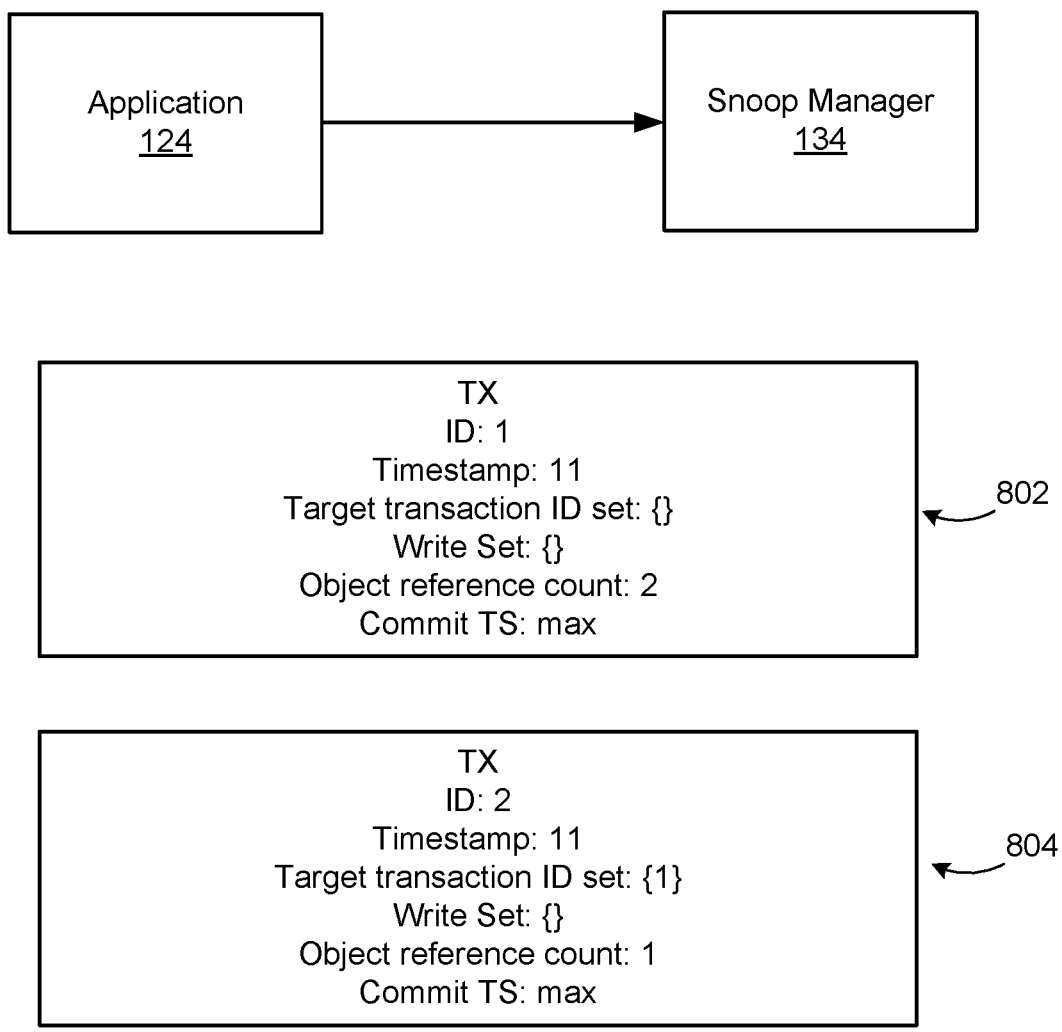
FIG. 8 is a block diagram illustrating an example implementation of the fourth operation of FIG. 4.

FIG. 8 is a block diagram illustrating the fourth operation 408 of FIG. 4, in which the transaction TX2 initiates snooping of the transaction TX1. Specifically, as referenced with respect to FIG. 1, the application 124 may be configured to call an API of the snoop manager 134, which may be represented as: snoopTransaction(TX, target TX).

In other words, for example, the user of the application 124 may designate both the snooping transaction and the target transaction, using the API of the snoop manager 134. For example, the user of the application 124 may be a developer of the database system 102. Additionally, or alternatively, developers of the database system 102 may hard-code appropriate code portions for calling the referenced API, as illustrated and described above with respect to the snoop request handler 132 of FIG. 1. Specific example operations and implementations of the application 124 are provided below, e.g., with respect to FIGS. 15-18.

Thus, in FIG. 8, a transaction object 802 corresponds to the transaction objects 502, 602 of FIGS. 5 and 6, and thus represents an updated version of the transaction object for the target transaction TX1. Meanwhile the transaction object 804 represents an updated version of the transaction object 702 of FIG. 7, and represents the transaction object for the snooping transaction TX2.

In FIG. 8, the transaction ID for the transaction TX1 is added to the target transaction ID set that indicates visible transactions for the transaction TX2, illustrated as the value {1}. Meanwhile, for the transaction object 802, the object reference count is incremented by 1, since the transaction object 802 is now referenced by the transaction TX2, so that a value of the object reference count of the transaction object 802 is set to a value of 2.

Figure 9:
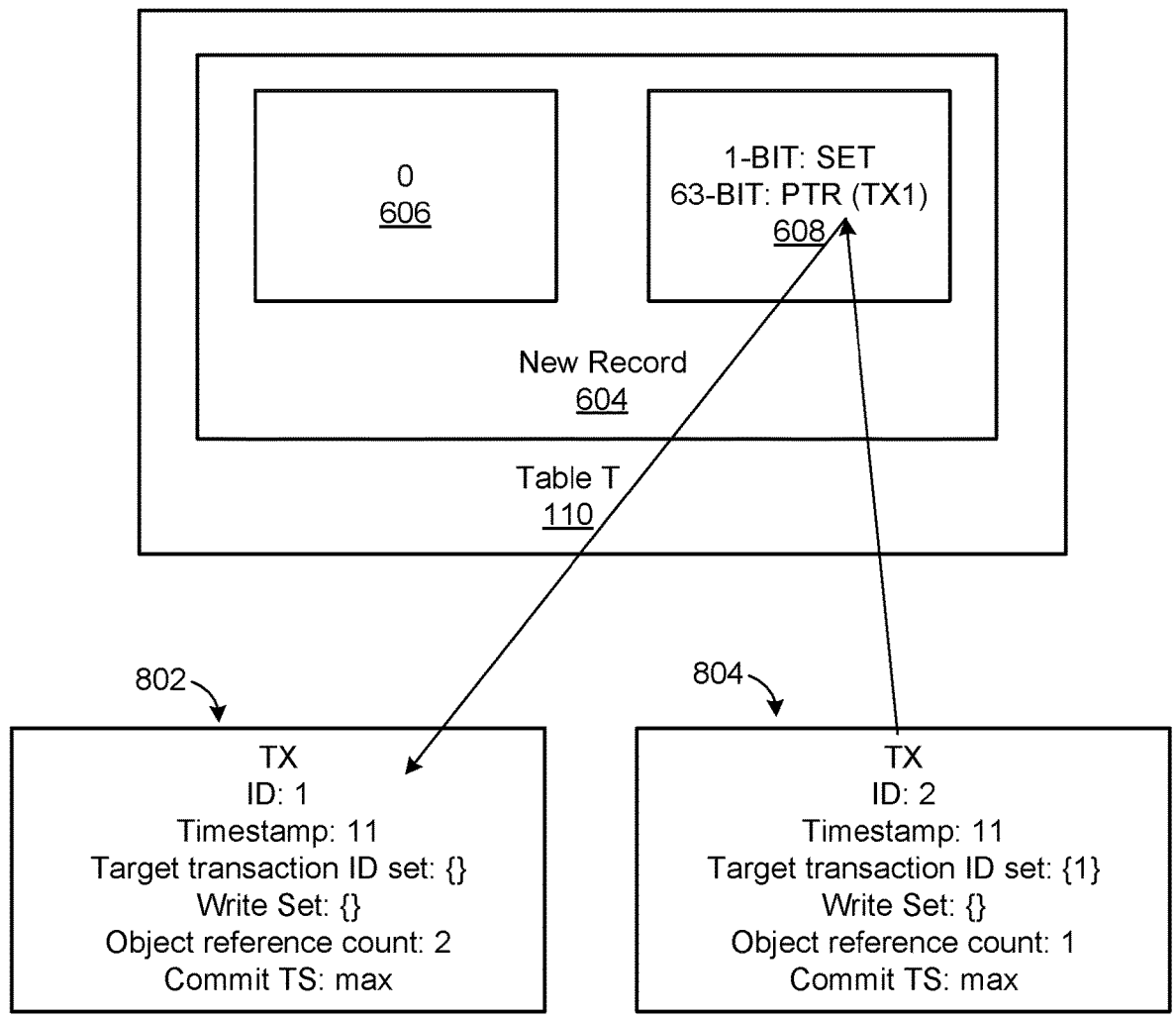
FIG. 9 is a block diagram illustrating an example implementation of the fifth operation of FIG. 4.

FIG. 9 is a block diagram illustrating implementation of a fifth operation 410 of FIG. 4. As described with respect to FIG. 4, the transaction TX2 executes a select command to read from the record 604 within the table 110. As described, the table 110 includes an uncommitted record 604 that would typically be invisible to other transactions.

Nevertheless, in FIG. 9, the transaction object 804 for the snooping transaction TX2 has a value of {1} within its target transaction ID set, and therefore proceeds to inspect the transaction information 608 for the requested record. Specifically, the snoop manager 134 may determine from the transaction information 608 that the transaction information is set to include a pointer to the corresponding transaction object 802 for the transaction TX1. Thus, by matching the transaction ID value stored within the target transaction ID set of the snooping transaction object 804 with the transaction ID stored within the transaction ID field of the target transaction object 802, to which the transaction information 608 points, the snoop manager 134 may determine that the snooping transaction TX2 is permitted to read the record value 606, even though the record value 606 is not associated with (a transaction having) a read uncommitted isolation level.

Figure 10:
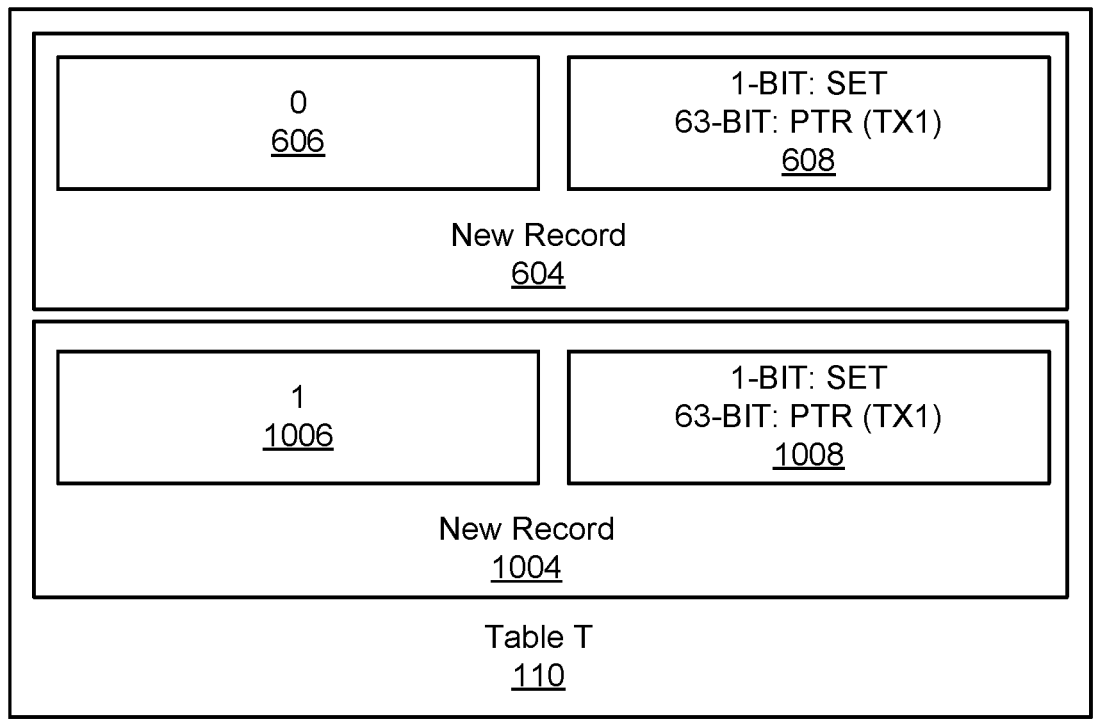
FIG. 10 is a block diagram illustrating an example implementation of the seventh operation of FIG. 4.
Figure 10:
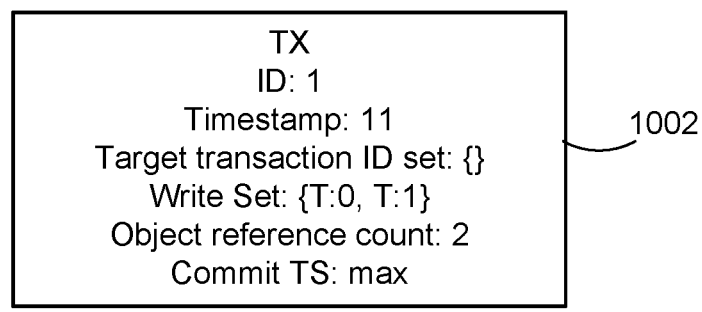

FIG. 10 is a block diagram illustrating implementation of the seventh operation 414 of FIG. 4. Specifically, as already described with respect to FIG. 4, the transaction TX1 may proceed to insert additional values (1) into the table 110. As shown in FIG. 10, a transaction object 1002 represents a corresponding, updated version of the target transaction object 802 of FIGS. 8 and 9, and thus has a value of 1 within the transaction ID field.

In FIG. 10, the transaction TX1 creates a new record 1004 within the table 110. As shown, the new record 1004 includes a record value 1006 having an example value of (1), along with transaction information 1008. The transaction information 1008 is illustrated as being set to include a pointer to the transaction object 1002. Further, the write set field of the transaction object 1002 is updated to include the value T:1, representing the insert operation described with respect to FIG. 10.

Figure 11:
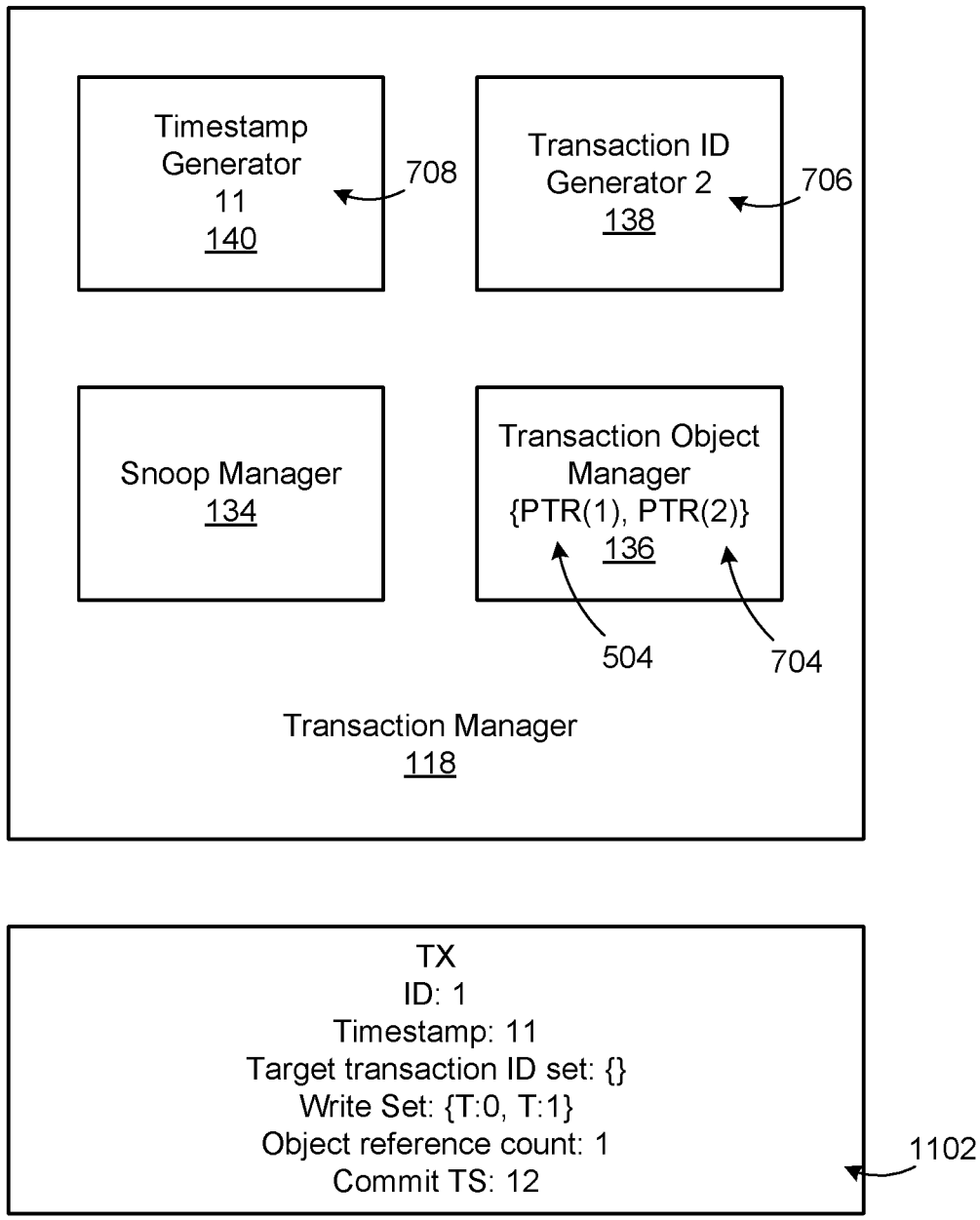
FIG. 11 is a block diagram illustrating an example implementation of the eighth operation of FIG. 4.

FIG. 11 is a block diagram illustrating the example implementation of the eighth operation 416 of FIG. 4. Accordingly, FIG. 11 illustrates a commit of the transaction TX1.

A transaction object 1102 corresponds to an updated version of the transaction object 1002 of FIG. 10, in which the commit timestamp field has been updated to a value of 12, as generated by the timestamp generator 140 and assigned by the transaction object manager 136. Further, compared to the transaction object 1002 of FIG. 10, it may be observed that the object reference count field of the transaction object 1102 is decremented from a value of 2 to a value of 1, reflecting that the transaction TX1 has committed, and therefore no longer references the transaction object 1102.

In other words, it may be observed that the transaction object 1102 for the transaction TX1 is maintained, even after the commit of the transaction TX1, so that the snooping transaction TX2 may continue to execute read uncommitted access operations, as long as the snooping transaction TX2 itself remains alive (i.e., has not yet committed).

Specifically, as shown, the transaction object 1102 for the target transaction TX1 is kept alive in conjunction with maintaining a positive value within the object reference count field, reflecting that the transaction object manager 136 maintains the previously-defined pointer 504 identifying the transaction TX1. Further in conjunction with the commit of the transaction TX1, the transaction object manager 136 may be configured to take ownership of the transaction object 1102 from the corresponding session previously maintained by the session manager 120.

Figure 12:
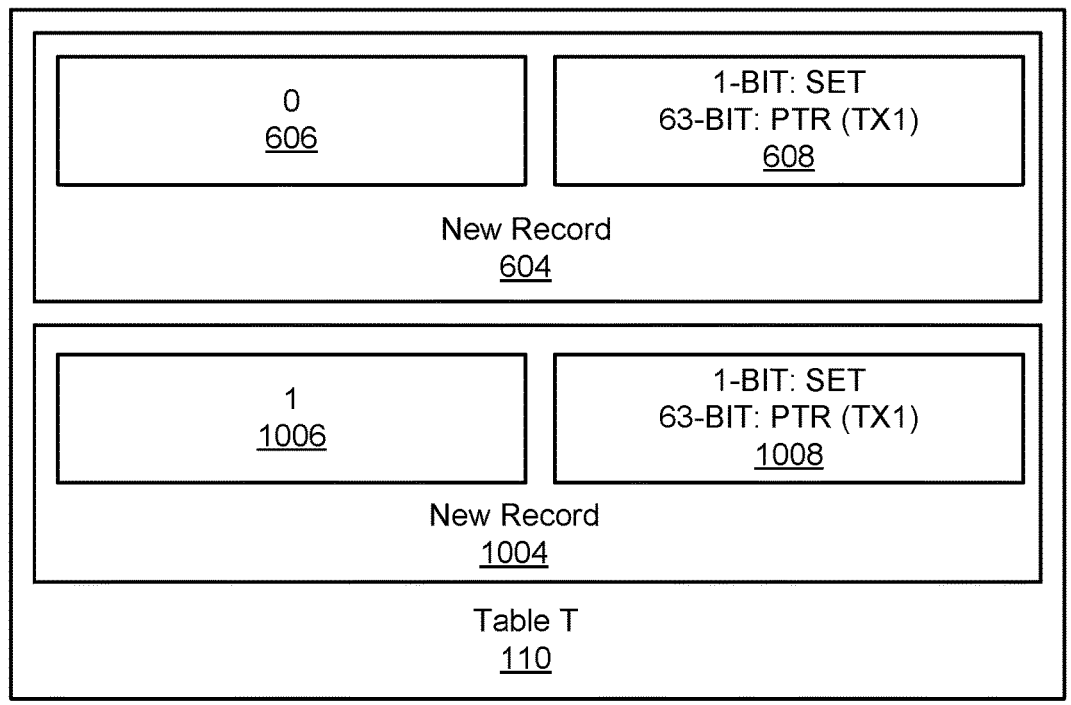
FIG. 12 is a block diagram illustrating an example implementation of the tenth operation of FIG. 4.
Figure 12:
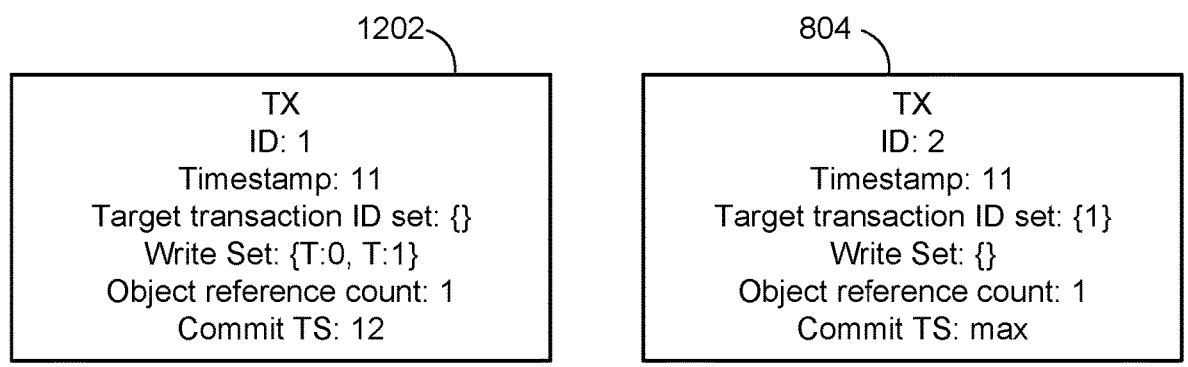

FIG. 12 is a block diagram illustrating an example implementation of the tenth operation 420 of FIG. 4. In the operation 420, the snooping transaction TX2 executes another select operation against the table 110. As shown and described, the table 110, at this time, includes the two committed records 604, 1004, both of which would typically be invisible to transactions having timestamps lower than the commit timestamp 12 of the transaction TX1.

As shown in FIG. 12, a transaction object 1202 illustrates an updated version of the transaction object 1102 of FIG. 11, reflecting the just-described commit of the transaction TX1. Specifically, because the snooping transaction object 804 continues to include the transaction ID with a value of 1 within the target transaction ID set field, the object reference count field of the transaction object 1202 remains set to 1, notwithstanding the already-executed transaction commit of the transaction TX1. Consequently, the transaction information 608 of the record 604 and the transaction information 1008 of the record 1004 continue to point to the transaction object 1202, and convey that the snooping transaction TX2 continues to have uncommitted read permission with respect to the record values 606, 1006.

Figure 13:
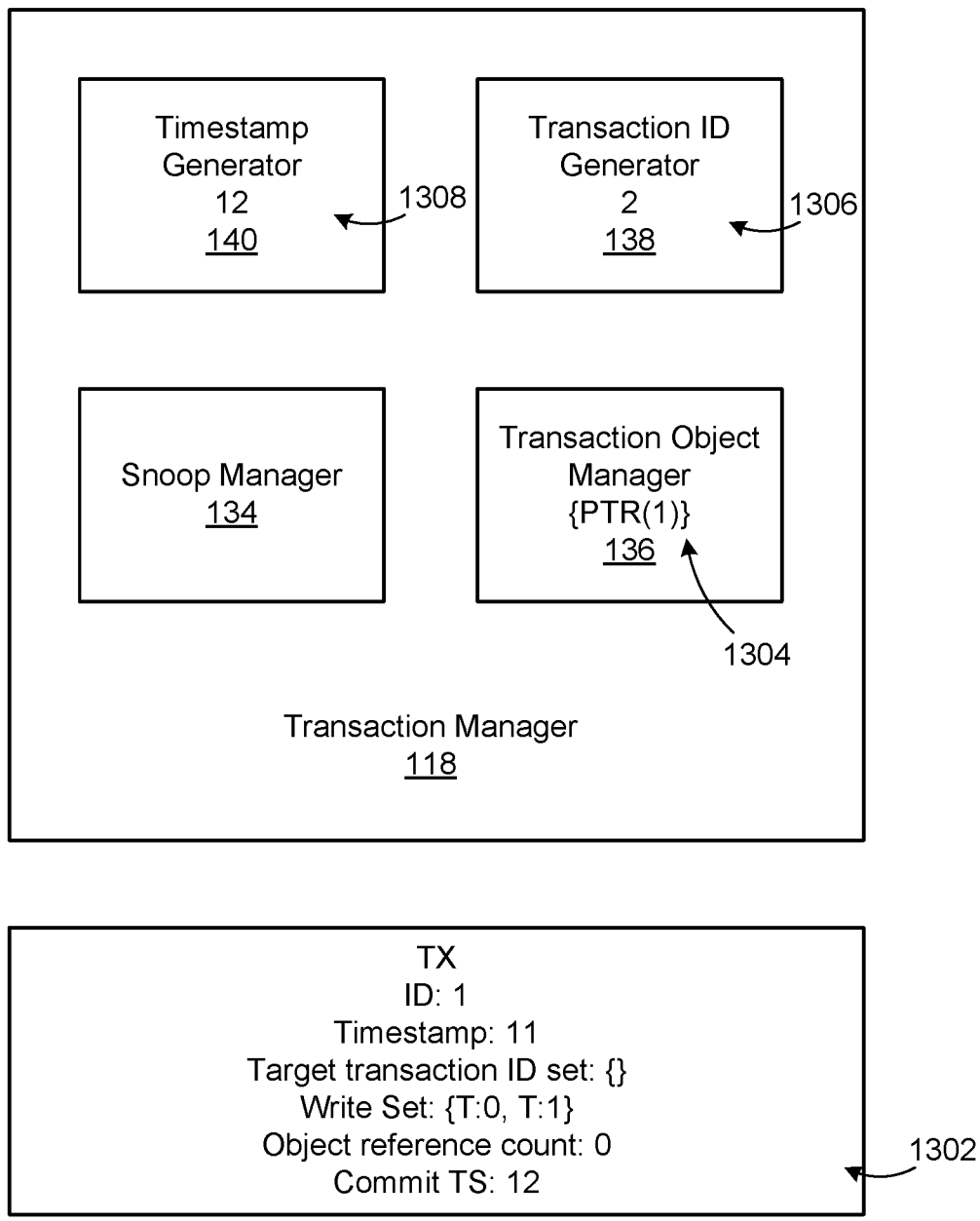
FIG. 13 is a block diagram illustrating an example implementation of the eleventh operation of FIG. 4.

FIG. 13 is a block diagram illustrating an example implementation of the eleventh operation 422 of FIG. 4, in which the transaction TX2 commits, and the corresponding transaction object 1202 is deallocated. As shown in FIG. 13, a transaction object 1302 corresponds to the transaction object 1202 of FIG. 12, but has the object reference count field decremented from a value of 1 to a value of 0, reflecting the deallocation of the transaction object 804.

Figure 14:
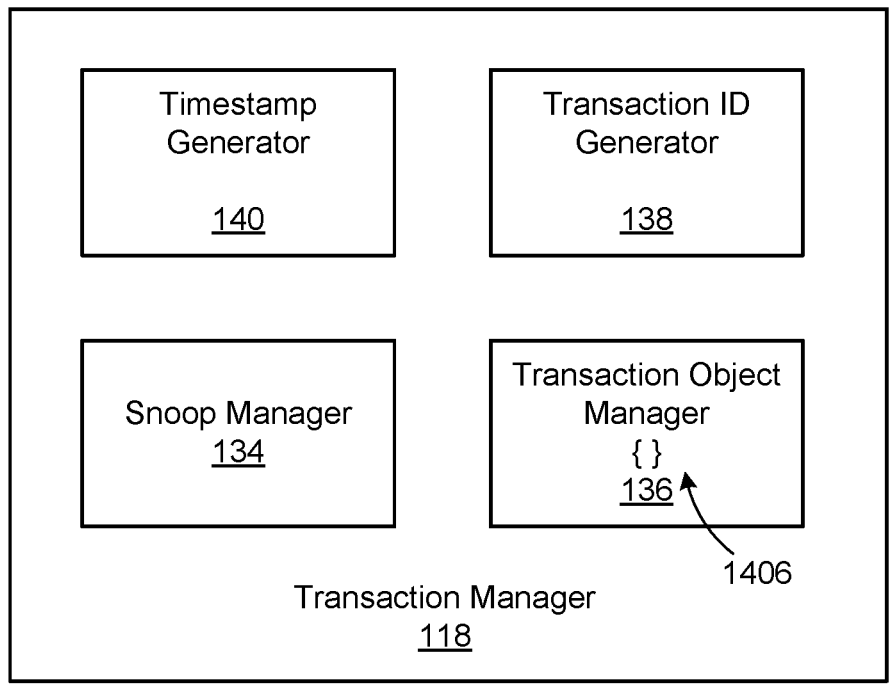
FIG. 14 is a block diagram illustrating an example implementation of the twelfth operation of FIG. 4.
Figure 14:
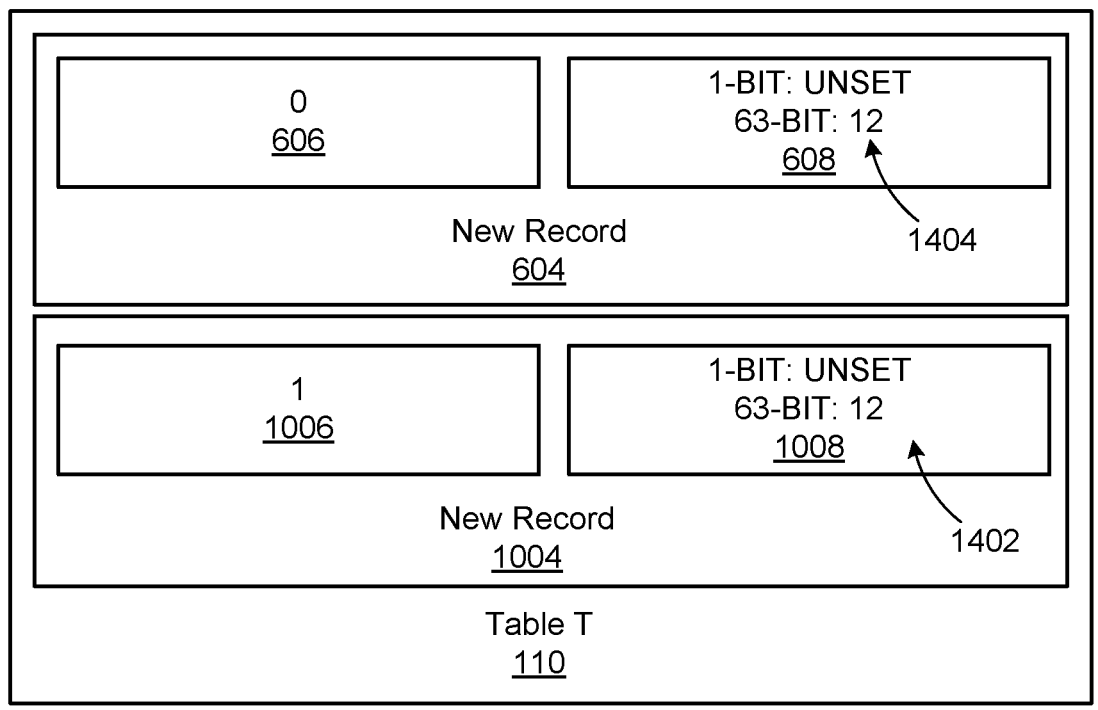

FIG. 14 is a block diagram illustrating an example implementation of the twelfth operation 424 of FIG. 4, in which a transaction object for the target transaction TX1 is deallocated. In other words, as just referenced with respect to the transaction object for the snooping transaction TX2, a decrement of the object reference count field from a value of 1 to a value of 0 causes object deallocation by the transaction object manager 136. The transaction object manager 136 follows the write set element for the transaction TX1, and replaces the pointers within the relevant transaction information fields with corresponding commit timestamps.

That is, as shown in FIG. 14, transaction information 1402 is updated (using the write set from the transaction object 1302 of FIG. 13), to thereby remove the previously-included pointer, to change the value of the first bit from set to unset, and to update the value of the remaining 63 bits to include and reflect a timestamp value of 12. Similar comments apply to transaction information 1404, while the transaction object manager 136 is illustrated as including an empty field 1406, reflecting destruction of the previously-included pointers.

FIGS. 15-18 illustrate and describe an example scenario in which the application 124 of FIG. 1 represents an application for workload capture and replay. For example, a particular software application may utilize a first version of a database system, and may be configured accordingly. If a second, newer version of the database system is released, then the software application may not be fully compatible with the second version. In order to test compatibility, it is possible to capture changes that occur during interactions between the software application and the first version to obtain a first result (i.e., capture a workload), and then replay those changes with the second version to obtain a second result. In this way, the first and second results may be compared, in order to assess and correct any potential compatibility issues.

The preceding scenario is merely one example of many different types of situations in which it may be desirable to allow transaction-specific, selective uncommitted read operations (e.g., debugging, or auditing), but is used with respect to FIGS. 15-18 for the sake of illustration and example.

Figure 15:
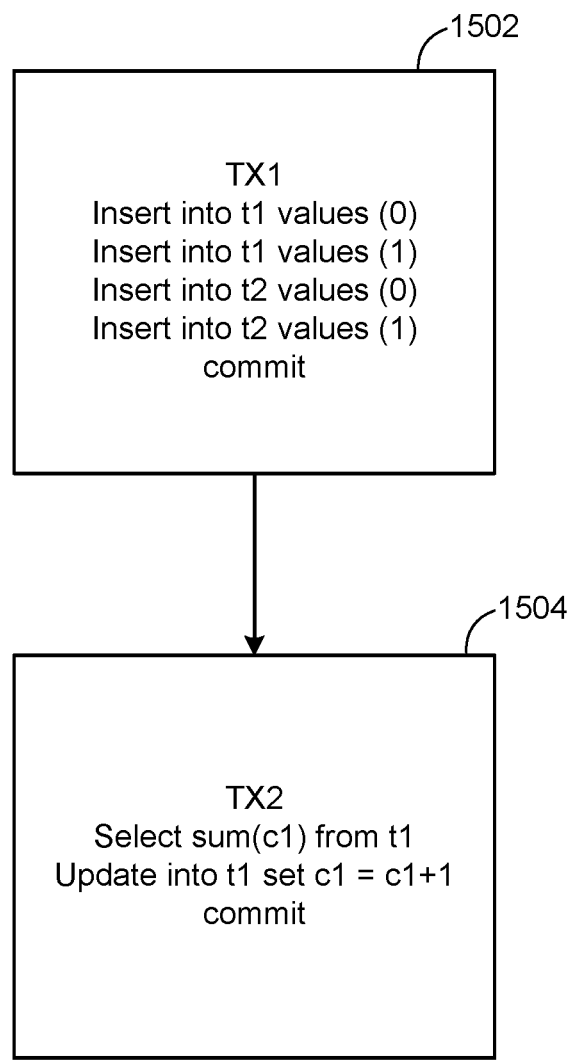
FIG. 15 is a block diagram of a dependency graph illustrating transactions used in a workload capture and replay scenario.

FIG. 15 is a block diagram of a dependency graph illustrating transactions used in a workload capture and replay scenario. In the example of FIG. 15, example transaction TX1 of node 1502 inserts values (0) into a table t1, inserts values (1) into table t1, inserts values (0) into table t2, and inserts values (1) into table t2. Then, in a node 1504, a transaction TX2 selects sum(c1) from table t1, and updates into t1 set c1=c1+1.

In short, FIG. 15 is intended to provide a simplified example in which TX1 updates t1 and t2, and TX2 updates and reads t1, and TX2 begins after TX1 commits. In such a scenario, it will be appreciated that if TX2 starts prior to a commit of TX1, the select statement of TX2 may return an incorrect result set, and the update statement of TX2 may not update desired records (i.e., will result in an inconsistent database state).

In the example, it is assumed that the application 124 (workload capture and reply application) includes a capture data preprocessor that is configured to analyze transactions of a given workload to be captured/replayed, and generate the type of dependency graph illustrated in FIG. 15. Then, FIG. 16 may be understood to represent example results of such capture data preprocessing, in which it is determined that TX2 may start (in replay mode) as soon as TX1 has completed updating t1, including performing uncommitted read operations, because TX2 actually requires only partial completion of TX1 in order to have all necessary information to begin and obtain correct, consistent results.

Figure 16:
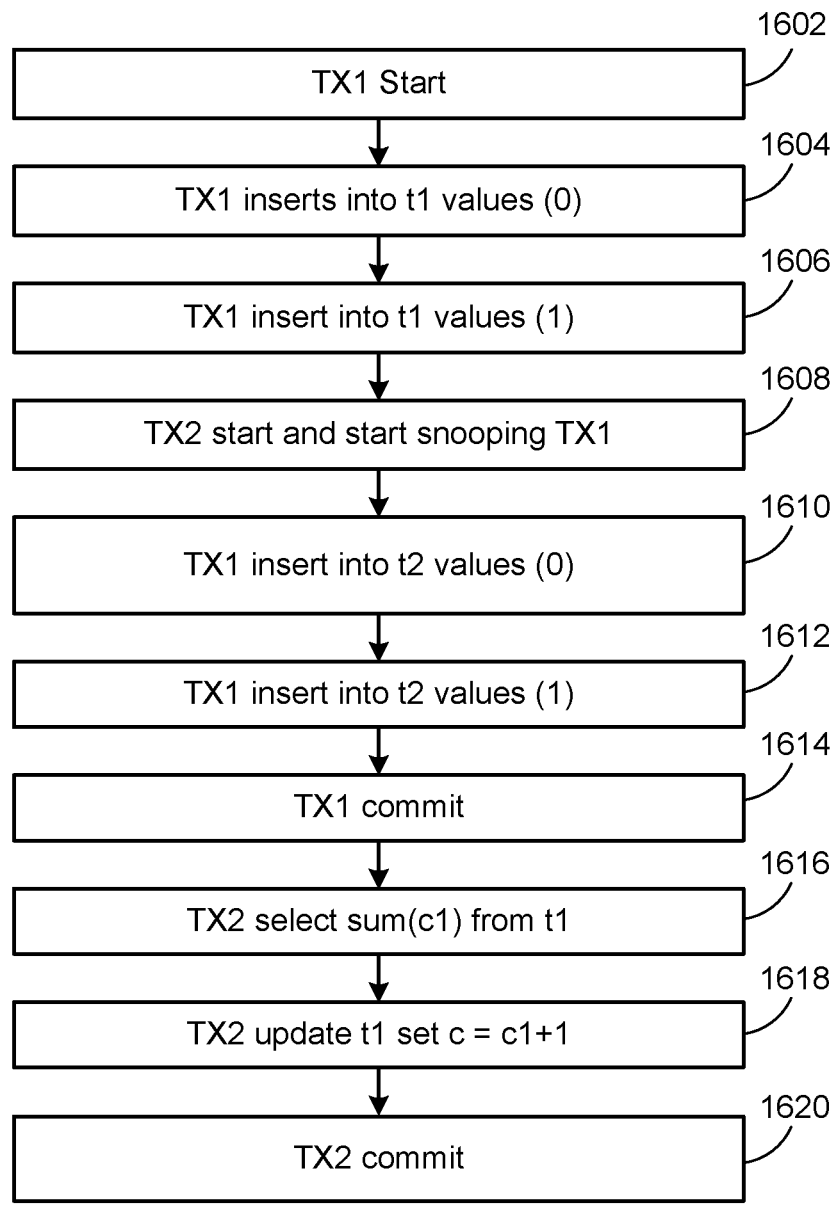
FIG. 16 is a flowchart illustrating example operations for injecting snooping operations into the transactions of FIG. 15.

Specifically, FIG. 16 is a flowchart illustrating example operations for injecting snooping operations into the transactions of FIG. 15. In FIG. 16, TX1 starts (1602), and inserts values (1) into table t1 (1604), and inserts values (1) into table t1 (1606).

At this point, the transaction TX2 begins and snoops transaction TX1 (1608), as described above with respect to FIGS. 1-14. Specifically, the transaction TX2 performs an uncommitted read operation of the values (0) and (1) from the table t1, even though the transaction TX1 has not yet committed.

FIG. 16 continues with TX1 inserting values (1) into table t2 (1610), and values (1) into table t2 (1612), followed by TX1 committing (1614). At this point, TX2 may proceed to select sum(c1) from t1 (1616) and to update t1 set c=c1+1 (1618), before TX2 then commits (1620).

Figure 17:
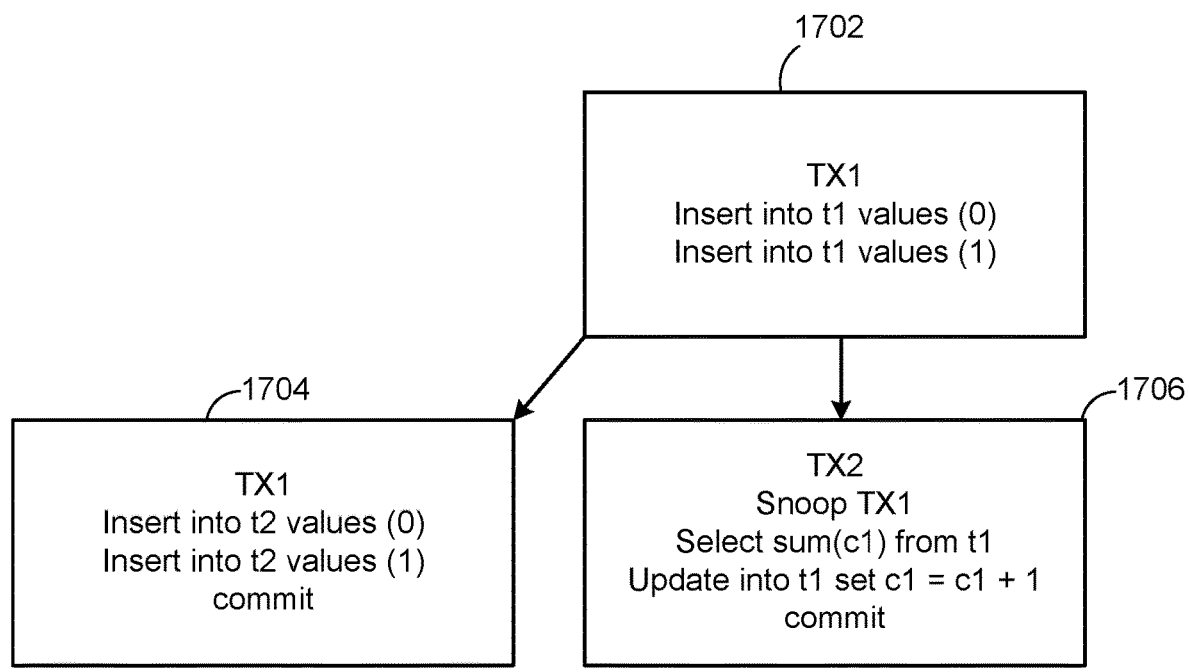
FIG. 17 is a block diagram of an optimized dependency graph obtained from the dependency graph of FIG. 15, using the techniques described with respect to FIG. 16.

FIG. 17 is a block diagram of an optimized dependency graph obtained from the dependency graph of FIG. 15, using the techniques described with respect to FIG. 16. As shown, a node 1702 and a node 1704 represent the original TX1, but split into separate transaction steps for purposes of the optimized dependency graph of FIG. 17. As shown, the nodes 1702, 1704 illustrate that the transaction TX2, represented by a node 1706, has no dependencies on the portion of the transaction TX1 of the node 1704.

Figure 18:
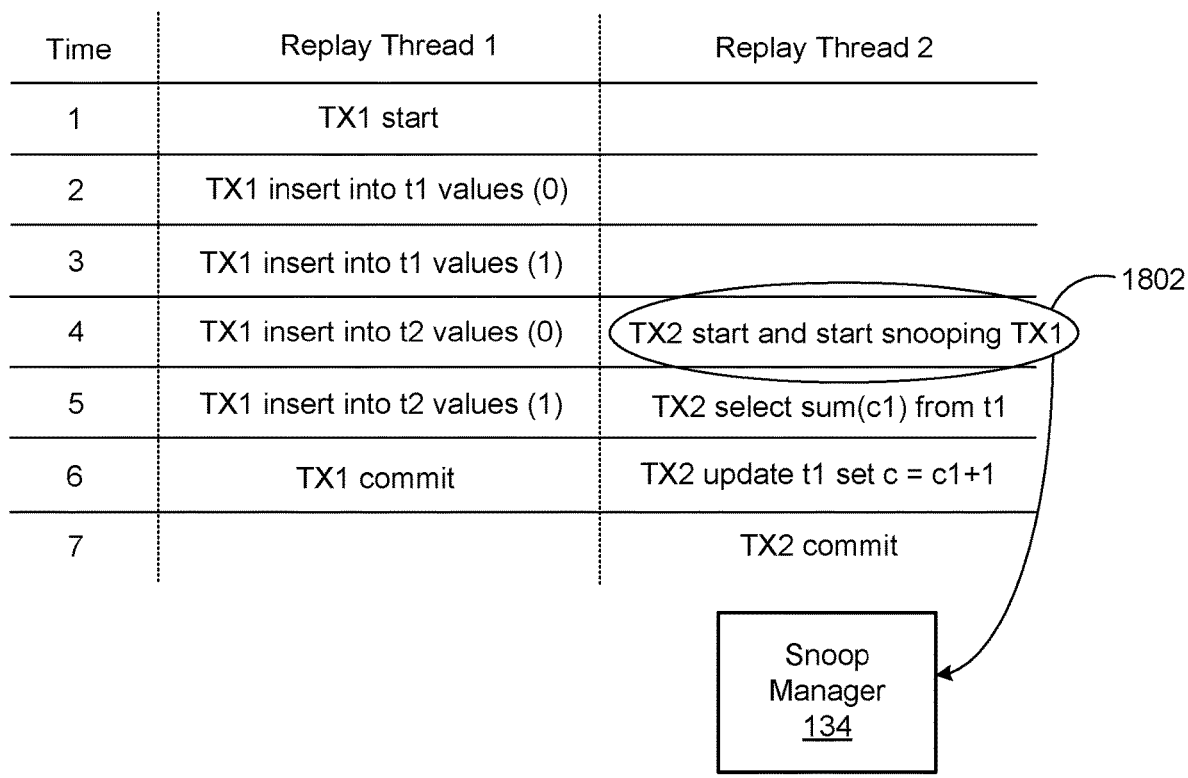
FIG. 18 is a timing diagram of a workload capture and replay scenario using the optimized dependency graph of FIG. 17.

FIG. 18 is a timing diagram of a workload capture and replay scenario using the optimized dependency graph of FIG. 17. As shown, multiple replay threads execute the replay operations of the captured workloads. In FIG. 18, an operation 1802 begins at time 4, which would otherwise have been required to wait until time 7 to begin.

Thus, FIGS. 15-18 illustrate that the system 100 of FIG. 1 may be configured to analyze a plurality of operations of a target transaction, and then identify a snooping injection point within the plurality of operations. The snooping injection point may be defined as a point within the plurality of operations, prior to which permitting the read access would result in an inconsistent database state, as just described. Then, the snooping transaction may be initiated at the snooping injection point.

FIG. 19 illustrates example pseudocode of an additional example implementation of the system 100 of FIG. 1. In FIG. 19, the result of the INSERT statement at line 2 would normally be visible to the SELECT statement at line 3, without being visible to the SELECT statement at line 5 (since the SELECT statement at line 5 belongs to a different transaction, as described herein, and assuming at least a read-committed isolation level). However, in FIG. 19, lines 4 and 6 illustrate that a transaction ID tid is obtained (1902), and used to enable the types of snooping transactions described herein (1904).

Figure 20:
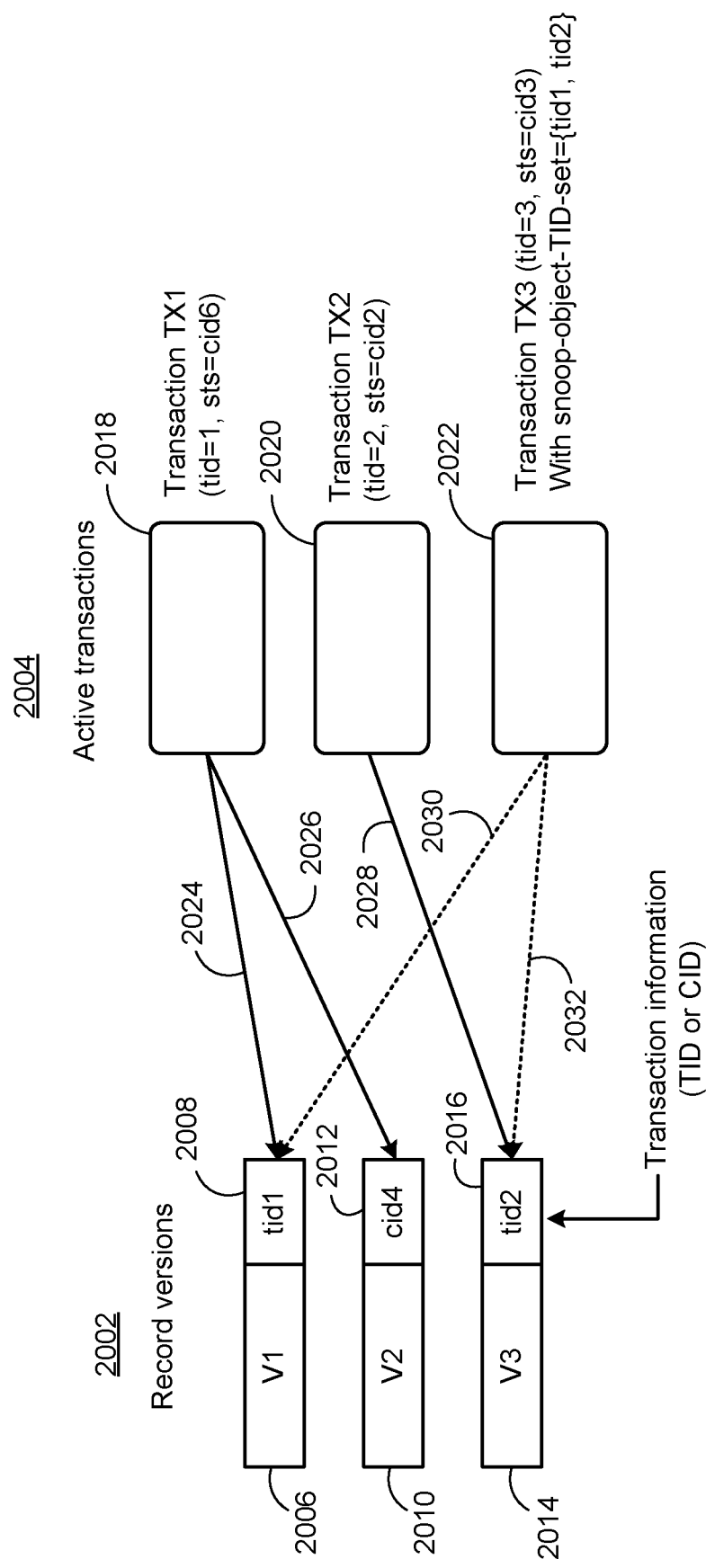
FIG. 20 is a block diagram illustrating another example implementation of the system 100 of FIG. 1.

FIG. 20 is a block diagram illustrating another example implementation of the system 100 of FIG. 1. In FIG. 20, each uncommitted record version has its creator transaction ID (TID). To decide the visibility of an uncommitted version, the target transaction ID set may be checked for matching with the target version's creator-TID value. If there is a match, the reading transaction is allowed to read the uncommitted record version.

In FIG. 20, record versions 2002 are used by active transactions 2004. The record versions include V1 2006 with tid 1 (2008), V2 2010 with cid 4 (2012), and V3 2014 with tid 2 (2016). Active transactions include TX1 2018, TX2 2020, and TX3 2022.

Thus, by way of notation, V1 and V3 are uncommitted record versions which are created by transactions TX1 (tid1) and TX2 (tid2), respectively. V2 is an already committed version. For an uncommitted version, TID 15 associated. For a committed version, commit ID (CID) is assigned.

Then, as shown by the arrows 2024-2032, transaction TX1 2018 can read from versions 2006, 2010 (arrows 2024, 2026), while the transaction TX2 can read from version 2014 (arrow 2028). Transaction TX3 2022 has a target transaction ID set of {tid1, tid2}, and can therefore read from versions 2006, 2014, even though those versions are not committed prior to the commit id (cid=3) of the snooping transaction TX3 2022.

In other words, V1 is visible to TX1 because TX1 is the creator of V1. But, V1 is also visible to TX3, because TX3 is snooping tid1. V2 is visible only to TX1 because V2 is a committed version and TX1 has higher snapshot timestamp (cid6) than the V2's creation timestamp (cid4). TX2 and TX3 cannot read V2 because cid4 is higher than their snapshot timestamps (cid2, cid3). V3 is visible to TX2 (creator transaction) and TX3 (snooping transaction).

Various additional aspects may be required. For example, if the target transaction has an 'abort' status, the snooping transaction may be prevented from snooping. If a snooping transaction already began snooping prior to the abort status being initiated, then garbage collection procedures for the aborted transaction may be modified to ensure that garbage collection is implemented as if the aborted transaction had been committed.

To implement the type of interface(s) described herein, it is possible to expose a system function such as SnoopUncommitedChanges( ), as described, e.g., with respect to FIG. 19, which identifies a member of the current transaction object, and obtains arguments of the target transaction ID. In other implementations, a more general SQL command may be exposed, such as SET TRANSACTION SNOOP UNCOMMITTED CHANGES <transaction ID>. These and other interface approaches may be provided for internal developers, and/or to other users.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or median of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:

receive a snoop request from a software application executing transactions in a session against a database, the snoop request specifying a target transaction and a snooping transaction of the transactions in the session, the snooping transaction being identified for read access for at least one uncommitted record from the target transaction, and the target transaction having an isolation level that prevents other transactions from reading uncommitted records of the target transaction, wherein the isolation level defines an extent to which a database transaction is isolated from reading changes made by other transactions;

link the snooping transaction to the target transaction by storing a target transaction identifier for the target transaction within a snooping transaction object of the snooping transaction;

store transaction information in conjunction with the at least one uncommitted record and specifying the target transaction identifier;

receive a read request from the snooping transaction that specifies the at least one uncommitted record;

grant an exception to the isolation level to the snooping transaction to enable the read access by the snooping transaction to the at least one uncommitted record, based on the target transaction identifier being specified in both the snooping transaction object and in the transaction information;

store a reference to a target transaction object of the target transaction from the snooping transaction object, the reference maintaining an allocation of the target transaction object following a commit of the target transaction, and until a commit of the snooping transaction occurs;

deallocate the target transaction object following the commit of the snooping transaction; and update the transaction information to remove the specifying of the target transaction identifier and include a commit timestamp for the commit of the snooping transaction.

2. The computer program product of claim 1, wherein the instructions, when executed, are further configured to cause the at least one computing device to:

analyze a plurality of operations of the target transaction;

identify a snooping injection point within the plurality of operations, prior to which permitting the read access would result in an inconsistent database state; and initiate the snooping transaction at the snooping injection point.

3. The computer program product of claim 1, wherein the instructions, when executed, are further configured to cause the at least one computing device to:
store the target transaction identifier for the target transaction within a target transaction set of all target transactions authorized to be snooped by the snooping transaction.

4. The computer program product of claim 1, wherein the instructions, when executed, are further configured to cause the at least one computing device to:
specify the target transaction identifier within the transaction information including storing a transaction pointer to a target transaction object of the target transaction, in which the target transaction identifier is stored.

5. The computer program product of claim 1, wherein the instructions, when executed, are further configured to cause the at least one computing device to:
read the transaction information stored in conjunction with the record to obtain the target transaction identifier, in response to the read request.

6. The computer program product of claim 1, wherein the instructions, when executed, are further configured to cause the at least one computing device to:
grant the read access including matching the target transaction identifier stored within the snooping transaction object to the target transaction identifier stored within a target transaction object of the target transaction, the target transaction object being identified by the transaction information.

7. The computer program product of claim 1, wherein the instructions, when executed, are further configured to cause the at least one computing device to:
grant the read access following a transaction commit of the target transaction, when the snooping transaction has a start time following a start time of the target transaction.

8. The computer program product of claim 1, wherein the instructions, when executed, are further configured to cause the at least one computing device to:
grant the read access independently of an isolation level of the target transaction or the snooping transaction.

9. A computer-implemented method, comprising:
receiving a snoop request from a software application executing transactions in a session against a database, the snoop request specifying a target transaction and a snooping transaction of the transactions in the session, the snooping transaction being identified for read access for at least one uncommitted record from the target transaction, and the target transaction having an isolation level that prevents other transactions from reading uncommitted records of the target transaction, wherein the isolation level defines an extent to which a database transaction is isolated from reading changes made by other transactions;
linking the snooping transaction to the target transaction by storing a target transaction identifier for the target transaction within a snooping transaction object of the snooping transaction;
storing transaction information in conjunction with the at least one uncommitted record and specifying the target transaction identifier;
receiving a read request from the snooping transaction that specifies the at least one uncommitted record;
granting an exception to the isolation level to the snooping transaction to enable the read access by the snooping transaction to the at least one uncommitted record, based on the target transaction identifier being specified in both the snooping transaction object and in the transaction information;
storing a reference to a target transaction object of the target transaction from the snooping transaction object, the reference maintaining an allocation of the target transaction object following a commit of the target transaction, and until a commit of the snooping transaction occurs;
deallocating the target transaction object following the commit of the snooping transaction; and
updating the transaction information to remove the specifying of the target transaction identifier and include a commit timestamp for the commit of the snooping transaction.

10. The method of claim 9, further comprising:
storing the target transaction identifier for the target transaction within a target transaction set of all target transactions authorized to be snooped by the snooping transaction.

11. The method of claim 9, further comprising:
specifying the target transaction identifier within the transaction information including storing a transaction pointer to a target transaction object of the target transaction, in which the target transaction identifier is stored.

12. The method of claim 9, further comprising:
reading the transaction information stored in conjunction with the record to obtain the target transaction identifier, in response to the read request.

13. The method of claim 9, further comprising:
granting the read access including matching the target transaction identifier stored within the snooping transaction object to the target transaction identifier stored within a target transaction object of the target transaction, the target transaction object being identified by the transaction information.

14. The method of claim 9, further comprising:
granting the read access independently of an isolation level of the target transaction or the snooping transaction.

15. A computer program product, the computer program product being tangibly embodied on a non-transitory computer-readable storage medium and comprising instructions that, when executed, are configured to cause at least one computing device to:
receive a snoop request for a database, the snoop request specifying a target transaction and a snooping transaction, the target transaction updating at least one table of the database and having an isolation level that prevents other transactions from reading uncommitted records of the target transaction, wherein the isolation level defines an extent to which a database transaction is isolated from reading changes made by other transactions;
link the snooping transaction to the target transaction by storing a target transaction identifier for the target transaction within a snooping transaction object of the snooping transaction;
store transaction information in conjunction with the at least one table and identifying a target transaction object of the target transaction, the target transaction object storing the target transaction identifier;
receive a read request from the snooping transaction that specifies the at least one table, at a time that the target transaction is uncommitted;

read the transaction information in response to the read request, to thereby identify the target transaction object therefrom;

grant an exception to the isolation level to the snooping transaction to enable the read request by the snooping transaction to the at least one table while the target transaction remains uncommitted, based on the target transaction identifier being specified in both the snooping transaction object and in the target transaction object;

store a reference to a target transaction object of the target transaction from the snooping transaction object, the reference maintaining an allocation of the target transaction object following a commit of the target transaction, and until a commit of the snooping transaction occurs;

deallocate the target transaction object following the commit of the snooping transaction; and update the transaction information to remove the specifying of the target transaction identifier and include a commit timestamp for the commit of the snooping transaction.

16. The computer program product of claim 15, wherein the instructions, when executed, are further configured to cause the at least one computing device to:

grant the read request independently of an isolation level of the target transaction or the snooping transaction.

17. The computer program product of claim 15, wherein the instructions, when executed, are further configured to cause the at least one computing device to:

store the target transaction identifier for the target transaction within a target transaction identifier set of the snooping transaction object, the target transaction identifier set specifying all target transactions authorized to be snooped by the snooping transaction.

* * * * *